US008108648B2

(12) United States Patent
Srinivasan et al.

(10) Patent No.: US 8,108,648 B2
(45) Date of Patent: Jan. 31, 2012

(54) VARIOUS METHODS AND APPARATUS FOR ADDRESS TILING

(75) Inventors: Krishnan Srinivasan, Cupertino, CA (US); Drew E. Wingard, Palo Alto, CA (US); Vida Vakilotojar, Mountain View, CA (US); Chien-Chun Chou, Saratoga, CA (US)

(73) Assignee: Sonics, Inc., Milpitas, CA (US)

( * ) Notice: Subject to any disclaimer, the term of this patent is extended or adjusted under 35 U.S.C. 154(b) by 377 days.

(21) Appl. No.: 12/402,704

(22) Filed: Mar. 12, 2009

(65) Prior Publication Data

US 2009/0235020 A1   Sep. 17, 2009

Related U.S. Application Data

(63) Continuation-in-part of application No. 12/145,052, filed on Jun. 24, 2008.

(60) Provisional application No. 60/946,096, filed on Jun. 25, 2007.

(51) Int. Cl.
*G06F 12/00* (2006.01)

(52) U.S. Cl. ............ 711/170; 711/5; 711/105; 711/173; 711/202

(58) Field of Classification Search .................. None
See application file for complete search history.

(56) References Cited

U.S. PATENT DOCUMENTS

| | | | |
|---|---|---|---|
| 5,708,659 A | 1/1998 | Rostoker et al. | |
| 5,948,089 A | 9/1999 | Wingard et al. | |
| 6,182,183 B1 | 1/2001 | Wingard et al. | |
| 6,249,144 B1 | 6/2001 | Agrawal et al. | |
| 6,330,225 B1 | 12/2001 | Weber et al. | |
| 6,393,500 B1 | 5/2002 | Thekkath | |
| 6,466,825 B1 | 10/2002 | Wang et al. | |
| RE37,980 E | 2/2003 | Elkhoury et al. | |
| 6,526,462 B1 | 2/2003 | Elabd | |
| 6,578,117 B2 | 6/2003 | Weber | |
| 6,725,313 B1 | 4/2004 | Wingard et al. | |
| 6,874,039 B2 | 3/2005 | Ganapathy et al. | |
| 6,877,076 B1 | 4/2005 | Cho et al. | |
| 7,116,131 B1 | 10/2006 | Chirania et al. | |
| 7,120,712 B2 | 10/2006 | Wingard et al. | |
| 7,149,829 B2 | 12/2006 | Weber et al. | |
| 7,155,554 B2 | 12/2006 | Vinogradov et al. | |
| 7,325,221 B1 | 1/2008 | Wingard et al. | |
| 7,543,088 B2 | 6/2009 | Weber et al. | |
| 7,543,093 B2 | 6/2009 | Chou et al. | |
| 7,552,292 B2 | 6/2009 | Hsieh et al. | |

(Continued)

OTHER PUBLICATIONS

Cross Reference to Related Applications Under 37 C.F.R. § 1.78, 2 pages, Jun. 30, 2011.

(Continued)

*Primary Examiner* — Shawn X Gu
(74) *Attorney, Agent, or Firm* — Rutan and Tucker, LLP

(57) ABSTRACT

Various methods and apparatus are described for a memory scheduler. The memory scheduler couples to a target memory core that includes a bank of memories. The memory scheduler contains two or more configurable address tiling functions to transform an incoming address of data requested in a request to the target memory core to determine what physical addresses in the bank of memories will service the first request. The two or more configurable address tiling functions are programmable by a user to create two or more distinctly different memory regions in the target memory core. Each memory region has its own distinct tiling function based on configuration parameters 1) selected by the user and 2) stored in tiling registers in the memory scheduler. The multiple tiling functions are configured to operate concurrently in the integrated circuit.

22 Claims, 12 Drawing Sheets

Table 1 New Tiling Function Register Pairs

| Address Offset | Register | Description |
|---|---|---|
| 0x120, 0x140, 0x160, 0x180, 0x1A0, 0x1C0, 0x1E0 | Tiling_Swap(0) to Tiling_Swap(6) | Base address for each register used for address swapping |
| 0x130, 0x150, 0x170, 0x190, 0x1B0, 0x1D0, 0x1F0 | Tiling_BAOP(0) to Tiling_BAOP(6) | Base address for each register used for bank address operation |

U.S. PATENT DOCUMENTS

| | | | |
|---|---|---|---|
| 7,587,535 | B2 | 9/2009 | Sawai |
| 7,852,343 | B2 | 12/2010 | Tanaka et al. |
| 7,899,953 | B2 | 3/2011 | Inoue |
| 2002/0129173 | A1 | 9/2002 | Weber et al. |
| 2002/0129210 | A1 | 9/2002 | Arimilli et al. |
| 2003/0004699 | A1 | 1/2003 | Choi et al. |
| 2003/0074520 | A1 | 4/2003 | Weber |
| 2004/0177186 | A1 | 9/2004 | Wingard et al. |
| 2005/0210164 | A1 | 9/2005 | Weber et al. |
| 2006/0218315 | A1 | 9/2006 | Okajima et al. |
| 2007/0094429 | A1 | 4/2007 | Wingard et al. |
| 2008/0086577 | A1 | 4/2008 | Huang |
| 2008/0320254 | A1 | 12/2008 | Wingard et al. |
| 2008/0320255 | A1 | 12/2008 | Wingard et al. |
| 2008/0320268 | A1 | 12/2008 | Wingard et al. |
| 2008/0320476 | A1 | 12/2008 | Wingard et al. |
| 2010/0042759 | A1 | 2/2010 | Srinivasan et al. |

OTHER PUBLICATIONS

Ahn, Jung Ho et al, The Design Space of Data-Parallel Memory Systems, IEEE, 12 pages, Nov. 2006.

EP 08780967.9 filed Jun. 25, 2008 Search Report dated Dec. 29, 2010.

Intel Dual-Channel DDR Memory Architecture White Paper informational brochure, Infineon Technologies North America Corporation and Kingston Technology, Company, Inc., 14 pages, Sep. 2003.

OCP (Open Core Protocol) Specification, Release 2.0, OCP International Partnership, OCP-IP Association, 210 pages, 2003.

PCT/US2008/068107 filed Jun. 25, 2008 International Preliminary Report on Patentability dated Jan. 15, 2010.

PCT/US2008/068107 filed Jun. 25, 2008 Search Report dated Oct. 8, 2008.

PCT/US2008/068107 filed Jun. 25, 2008 Written Opinion dated Oct. 8, 2008.

U.S. Appl. No. 12/145,257, filed Jun. 24, 2008 Non-Final Office Action dated Feb. 2, 2011.

U.S. Appl. No. 12/573,669, filed Oct. 5, 2009 Non-Final Office Action dated Apr. 12, 2011.

Weber, Wolf-Dietrich et. al, A Quality-of-Service Mechanism for Interconnection Networks in System-on-Chips, 1530-1591/05, IEEE, 6 pages, 2005.

Weber, Wolf-Dietrich, Efficient Shared DRAM Subsystems for SOCs, Sonics, Inc, Systems on the ICs, pp. 6 pages, 2001.

Wingard, Drew, A Non-Blocking Intelligent Interconnect for AMBA-Connected SoCs, Sonics, Inc., CoWare Arm Developer's Conference, 39 pages, Oct. 6, 2005.

Wingard, Drew, Socket-based Design Using Decoupled Interconnects, Interconnect-Centric Design for Advanced SOC and NOC, 30 pages, 2002.

Wingard, Drew, Sonics SOC Integration Architecture presentation, Systems-ON-ICS, 25 pages, Jan. 28, 1999.

Wingard, Drew, Tiles: the Heterogeneous Processing Abstraction for MPSoc presentation, Sonics, Smart Interconnect IP, 5 pages, Jul. 7, 2004.

Non-Final Office Action for U.S. Appl. No. 12/145,052 mailed Nov. 8, 2011, 27 pages.

Final Office Action for U.S. Appl. No. 12/573,669 mailed Sep. 8, 2011, 43 pages.

Table 1 New Tiling Function Register Pairs

| Address Offset | Register | Description |
|---|---|---|
| 0x120, 0x140, 0x160, 0x180, 0x1A0, 0x1C0, 0x1E0 | Tiling_Swap(0) to Tiling_Swap(6) | Base address for each register used for address swapping |
| 0x130, 0x150, 0x170, 0x190, 0x1B0, 0x1D0, 0x1F0 | Tiling_BAOP(0) to Tiling_BAOP(6) | Base address for each register used for bank address operation |

Table 2 Tiling_Swap(i) Register

| Bits | Field | Range | Default | R/W | Description |
|---|---|---|---|---|---|
| 63:62 | Unused | NA | 0 | NA | Unused |
| 61:56 | ILOC5 | 0, or ≥ D and < A | 0 | RW | $ILOC_5$: Integer indicating the LSB of the 5th segment in the Sys OCP address |
| 55:50 | Len4 | 0, or <= A | 0 | RW | $L_4$: Integer indicating the length of the 4th segment |
| 49:44 | ILOC4 | 0, or ≥ D and < A | 0 | RW | $ILOC_4$: Integer indicating the LSB of the 4th segment in the Sys OCP address |
| 43:38 | Len3 | 0, or <= A | 0 | RW | $L_3$: Integer indicating the length of the 3rd segment |
| 37:32 | ILOC3 | 0, or D and < A | 0 | RW | $ILOC_3$: Integer indicating the LSB of the 3rd segment in the Sys OCP address |
| 31:30 | Reserved | NA | 0 | NA | Reserved |
| 29:24 | Len2 | 0, or <= A | 0 | RW | $L_2$: Integer indicating the length of the 2nd segment |
| 23:18 | ILOC2 | 0, or ≥ D and < A | 0 | RW | $ILOC_2$: Integer indicating the LSB of the 2nd segment in the Sys OCP address |
| 17:12 | Len1 | 0, or <= A | 0 | RW | $L_1$: Integer indicating the length of the 1st segment |
| 11:06 | ILOC1 | 0, or ≥ D and < A | 0 | RW | $ILOC_1$: Integer indicating the LSB of the 1st segment in the Sys OCP address |
| 05:00 | Len0 | 0, or <= A | 0 | RW | $L_0$: Integer indicating the length of the 0th segment |

Table 3  Tiling_BAOP(i) Register

| Bits | Field | Range | Default | R/W | Description |
|---|---|---|---|---|---|
| 63:22 | Unused | NA | 0 | NA | Unused |
| 21:19 | high_en | Full | 0 | RW | Vector whose size is given by BAOP.width. A bit in this vector is set to 1 if the corresponding bit in horizontal tiling should be part of BAOP Function |
| 17:15 | low_en | Full | 0 | RW | Vector whose size is given by BAOP.width. A bit in this vector is set to 1 if the corresponding bit in vertical tiling should be part of BAOP Function |
| 13:8 | high_loc | 0, or ≥D and <A | 0 | RW | Integer to indicate the LSB for high OP bits |
| 7:2 | low_loc | 0, or ≥D and <A | 0 | RW | Integer to indicate the LSB for low OP bits |
| 1:0 | Width | Full | 0 | RW | Width of the high and low OP bits (Max = 3) |

Table 6  Configuration Settings of a Tiling Function

| Bit | Value | Bit | Value |
|---|---|---|---|
| Len0 | 7 | ILOC1 | 14 |
| Len1 | 1 | ILOC2 | 12 |
| Len2 | 4 | ILOC3 | 7 |
| Len3 | 2 | ILOC4 | 8 |
| Len4 | 5 | ILOC5 | 19 |
|  |  |  |  |
| BAOP.low_en | B'01 | BAOP.low_loc | 7 |
| BAOP.high_en | B'10 | BAOP.high_loc | 24 |
|  |  | BAOP.width | 2 |

Table 4 | Un-tiled vs Tiled

| | Un-tiled | | | Tiled | | |
|---|---|---|---|---|---|---|
| Incoming Address | Page Address | Bank Address | Page Hit/Miss | Tiled Address | Page Address | Bank Address | Page Hit/Miss |
| 0x00000000 | 0x0000 | 0x0 | Miss | 0x00000000 | 0x0000 | 0x0 | Miss |
| 0x00010000 | 0x0008 | 0x0 | Miss | 0x00000010 | 0x0000 | 0x0 | Hit |
| 0x00020000 | 0x0010 | 0x0 | Miss | 0x00000020 | 0x0000 | 0x0 | Hit |
| 0x00030000 | 0x0018 | 0x0 | Miss | 0x00000030 | 0x0000 | 0x0 | Hit |

VARIOUS METHODS AND APPARATUS FOR ADDRESS TILING

RELATED APPLICATIONS

This application is a continuation in part application of and claims the benefit of both U.S. Provisional Patent Application Ser. No. 60/946,096, titled "An interconnect implementing internal controls," filed Jun. 25, 2007 as well as U.S. utility patent application Ser. No. 12/145,052 titled "VARIOUS METHODS AND APPARATUS TO SUPPORT TRANSACTIONS WHOSE DATA ADDRESS SEQUENCE WITHIN THAT TRANSACTION CROSSES AN INTERLEAVED", filed Jun. 24, 2008. U.S. utility patent application Ser. No. 12/145,052 also is a continuation in part application of and claims the benefit of U.S. Provisional Patent Application Ser. No. 60/946,096.

NOTICE OF COPYRIGHT

A portion of the disclosure of this patent document contains material that is subject to copyright protection. The copyright owner has no objection to the facsimile reproduction by anyone of the software engine and its modules, as it appears in the Patent and Trademark Office Patent file or records, but otherwise reserves all copyright rights whatsoever.

FIELD OF THE INVENTION

Embodiments of the invention generally relate to address tiling in an integrated circuit.

BACKGROUND OF THE INVENTION

The performance of a Dynamic Random Access Memory (DRAM) memory system is dependent on the accesses that are presented to it. A system with a high page-hit rate generally performs better than one with a lower page-hit rate. In order to improve the page hit rate, a concept of address tiling is introduced. Essentially, address tiling is the transformation on the system address bits to generate a memory address such that the page hit rate in the DRAM is improved. The memory scheduler attempts to improve DRAM utilization by preferring requests that hit the page over those that cause a page miss.

SUMMARY OF THE INVENTION

Various methods and apparatus are described for a memory scheduler. An integrated circuit may include an interconnect, multiple initiator IP cores, multiple target IP cores, and the memory scheduler. The interconnect for the integrated circuit communicates requests and responses between multiple initiator IP cores and multiple target IP cores coupled to the interconnect. An address map with assigned addresses for the target IP cores and initiator cores in the integrated circuit supports routing the requests and responses between the target IP cores and initiator IP cores in the integrated circuit. The memory scheduler couples to a target memory core of the target IP cores that includes a bank of memories. The memory scheduler contains two or more configurable address tiling functions to transform an incoming address of data requested in a request to the target memory core to determine what physical addresses in the bank of memories will service the first request. The two or more configurable address tiling functions are programmable by a user to create two or more distinctly different memory regions in the target memory core. Each memory region has its own distinct tiling function based on configuration parameters 1) selected by the user and 2) stored in tiling registers in the memory scheduler. The multiple tiling functions are configured to operate concurrently in the integrated circuit.

BRIEF DESCRIPTION OF THE DRAWINGS

The drawings refer to embodiments of the invention in which:

FIGS. 2-4 illustrate tables 1-3 of the configurable parameters selected by the user and stored in tiling registers in the memory scheduler;

FIG. 9b illustrates Table-6 showing a register block programmed for a tiling function for the first memory region in the target DRAM;

FIG. 10 illustrates Table-4 with an example address tiling function to improve DRAM utilization for a 2D BLCK burst;

Figure 1:
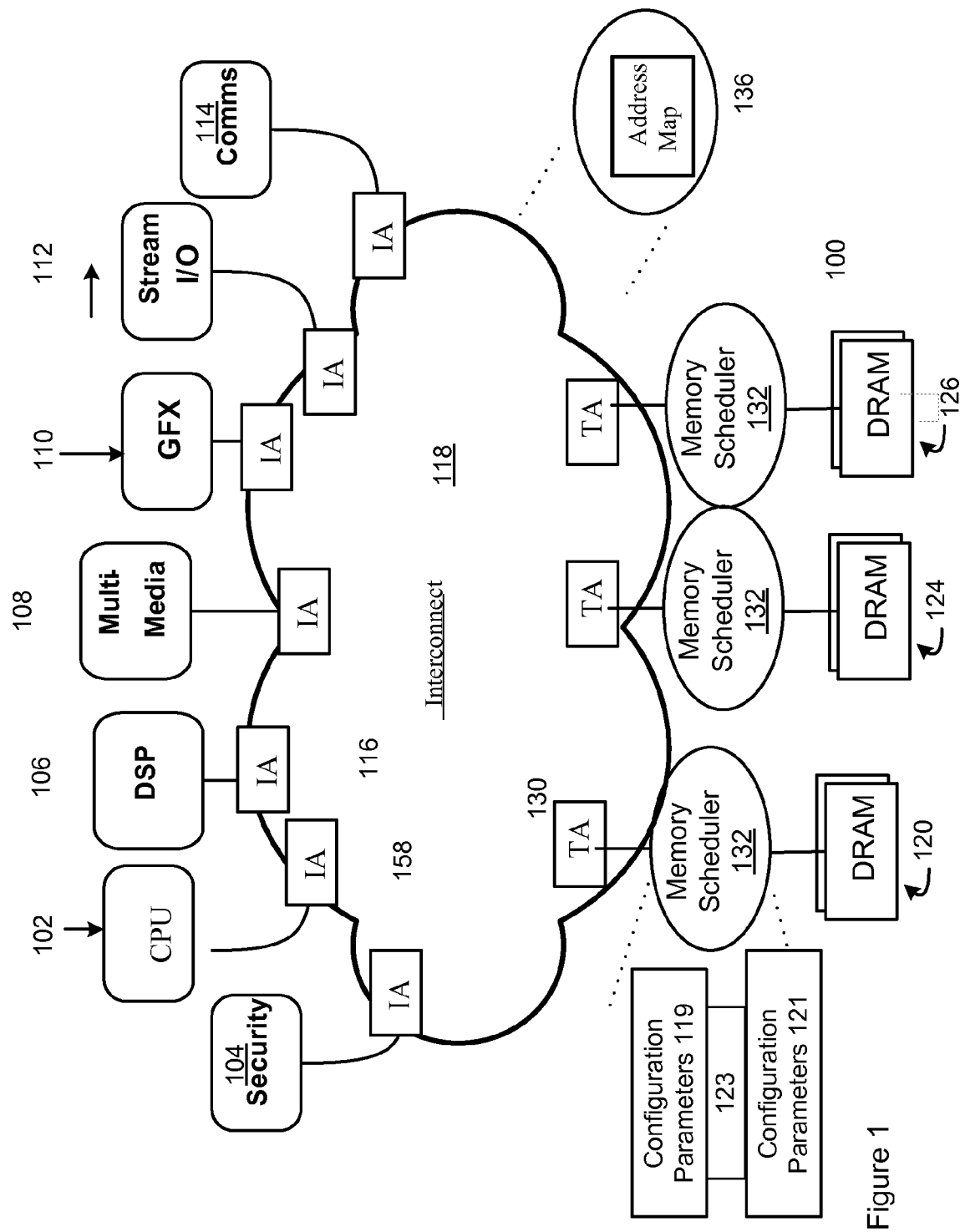
FIG. 1 illustrates a block diagram of an embodiment of a System-on-a-Chip having multiple initiator IP cores and multiple target IP cores that communicate read and write requests as well as responses to those requests over an interconnect.

While the invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the invention.

DETAILED DISCUSSION

In the following description, numerous specific details are set forth, such as examples of specific data signals, named components, connections, number of address bits, etc., in order to provide a thorough understanding of the present invention. It will be apparent, however, to one of ordinary skill in the art that the present invention may be practiced without these specific details. In other instances, well known components or methods have not been described in detail but rather in a block diagram in order to avoid unnecessarily obscuring the present invention. Further specific numeric references such as first target, may be made. However, the specific numeric reference should not be interpreted as a literal sequential order but rather interpreted that the first target is different than a second target. Thus, the specific details set forth are merely exemplary. The specific details may be varied from and still be contemplated to be within the spirit and scope of the present invention. Further features in one embodiment may be used in another embodiment.

In general, various methods and apparatus are discussed for a memory scheduler coupled in between an interconnect and a target memory core of the target IP cores that includes a DRAM bank of memories. The memory scheduler contains two or more configurable address tiling functions to transform an incoming address of data requested in a request to the target memory core to determine what physical addresses in the bank of memories will service this request. The two or more configurable address tiling functions are programmable by a user to create two or more distinctly different memory regions in the target memory core. Each memory region having its own distinct tiling function based on configuration parameters 1) selected by the user and 2) stored in tiling registers in the memory scheduler 132. The multiple tiling functions are configured to operate concurrently in the integrated circuit.

The address space in the first target memory core is divided to create two or more regions of memory and each region has its own distinctly different address tiling function based on the tiling register settings for that region. The tiling registers are defined in such to perform a tiling function of a first operation of address bit swapping in the incoming address of a request and an outgoing response, which is used to improve page hit rates of block bursts and then a second operation of applying a Boolean logic function, such as an ADD, that manipulates bank address bits in the incoming address of the request and the outgoing response, which is used to minimize back to back page misses to the same bank. Both swapping operations are configurable from a user.

The address tiling may be performed on the burst request after the burst request has been chopped by chopping logic in the interconnect to have a starting address of an initial word in the burst request and ending address of the last word in the burst request to fit within a DRAM block size so no further chopping needs to occur for the DRAM to service this first request.

In order to cater to the varied nature of application traffic, the memory scheduler has logic to support seven run-time configurable tiling functions, where each tiling function is programmed into a register block.

In its most general form, address tiling refers to a transformation on the incoming address to produce an outgoing address. In the realm of DRAM memory systems, address tiling on the system address bits to generate a memory address is done primarily to improve the page hit rate in the DRAM system, and thus improve the utilization of the DRAM memory. Address tiling is a transformation on the system address bits to generate a memory address such that the page hit rate in the DRAM is improved. The configurable address tiling lets users/designers rearrange DRAM address organization to exploit 2D locality, and allows 2D data fetches with no more than one page miss or exploit any other software access pattern that that the user/designer knows will be routinely accessing the DRAM.

FIG. 1 illustrates a block diagram of an embodiment of an integrated circuit, such as a System-on-a-Chip, having multiple initiator IP cores and multiple target IP cores that communicate read and write requests as well as responses to those requests over an interconnect. Each initiator IP core such as a CPU IP core 102, an on-chip security IP core 104, a Digital Signal Processor (DSP) 106 IP core, a multimedia IP core 108, a Graphics IP core 110, a streaming Input-Output (I/O) IP core 112, a communications IP core 114, and other similar IP cores may have its own initiator agent 116 to interface with the interconnect 118. Each target IP core such as a first DRAM IP core 120 through a third DRAM IP core 126 may have its own target agent 130 to interface with the interconnect 118. Each DRAM IP core 120-126 may have an associated memory scheduler 132 as well as a DRAM controller.

The Intellectual Property cores (IP) have self-contained designed functionality to provide that macro function to the system. The interconnect 118 implements an address map 136 with assigned address for the target IP cores 120-126 and potentially the initiator IP cores 102-114 in the system to route the requests and potentially responses between the target IP cores 120-126 and initiator IP cores 102-114 in the integrated circuit. One or more address generators may be in each initiator IP core to provide the addresses associated with data transfers that the IP core will initiate to memories or other target IP cores. All of the IP cores may operate at different performance rates (i.e. peak bandwidth, which can be calculated as the clock frequency times the number of data bit lines (also known as data width), and sustained bandwidth, which represents a required or intended performance level). Most of the distinct IP cores communicate to each other through the memory IP cores 120-126 on and off chip. The DRAM memory schedule 132 abstracts the real addresses in each DRAM IP core 120-126 from other on-chip cores by performing a tiling function to performing address transformation of addresses in a request to physical addresses in the memory itself.

The DRAM memory scheduler 132 is connected downstream of a target agent 130 interfacing the interconnect 118. The interconnect 118 provides a shared communications bus between IP core sub-systems 120-126 and 102-114 of the system. All the communication paths in the shared communication bus need not pass through a single choke point rather many distributed pathways may exist in the shared communication bus. The on-chip interconnect 118 may be a collection of mechanisms that may be adapters and/or other logical modules along with interconnecting wires that facilitate address-mapped and arbitrated communication between the multiple Intellectual Property cores 102-114 and 120-126.

The interconnect 118 may be part of an integrated circuit, such as System-on-a-Chip, that is pipelined with buffering to store and move requests and responses in stages through the System-on-a-Chip. The interconnect 118 may have flow control logic that is 1) non-blocking with respect to requests from another thread as well as with respect to requiring a response to an initial request before issuing a subsequent request from the same thread, 2) implements a pipelined protocol, and 3) maintains each thread's expected execution order. The interconnect also may support multiple memory channels, with 2D and address tiling features, response flow control, and chopping of individual burst requests. Each initiator IP core may have its own initiator agent to interface with the interconnect. Each target IP core may have its own target agent to interface with the interconnect.

The interconnect 118 implements an address map 136 with assigned address for target IP cores 124-126 in the integrated circuit 100 to route the requests between the target IP cores and initiator IP cores in the integrated circuit and a first target of the target IP cores 124-126 that includes a [DRAM] bank of memories coupled to the memory scheduler 132 that contains two or more configurable address tiling functions to transform an incoming address of data requested in a first request to the first target to determine what physical addresses in the bank of memories will service the first request.

The memory scheduler 132 coupled in between the interconnect 118 and a target memory core of the target IP cores that includes a DRAM bank of memories, such as a first DRAM 120. The memory scheduler 132 contains two or more configurable address tiling functions to transform an incoming address of data requested in a request to the target memory core to determine what physical addresses in the bank of memories will service this request. The two or more configurable address tiling functions are programmable by a user to create two or more distinctly different memory regions in the target memory core. Each memory region having its own distinct tiling function based on configuration parameters 1) selected by the user and 2) stored in tiling registers 119, 121 in the memory scheduler 132. The multiple tiling functions are configured to operate concurrently in the integrated circuit 100.

The address space in the target memory core, such as DRAM 124, is divided to create two or more regions of memory and each region has its own distinctly different address tiling function based on the tiling register 119, 121 settings for that region. The tiling registers 119, 121 are defined in such to perform a tiling function of a first operation of address bit swapping in the incoming address of a request and an outgoing response, which is used to improve page hit rates of block bursts and then a second operation of applying a Boolean logic function, such as an ADD, that manipulates bank address bits in the incoming address of the request and the outgoing response, which is used to minimize back to back page misses to the same bank. Both swapping operations are configurable from a user.

The address tiling is performed on the burst request after the burst request has been chopped by chopping logic in the interconnect 118 to have a starting address of an initial word in the burst request and ending address of the last word in the burst request to fit within a bank and not span across a bank address boundaries (DRAM_BLOCK_SIZE) so no further chopping needs to occur.

Each memory core 120-126 may be a single memory or multiple external DRAM chips ganged together to act as a single memory make the width of a data word such as 64 bits or 128 bits. Each IP core and DRAM chip may have multiple banks inside that IP core/chip. Each channel may contain one or more buffers that can store requests and/or responses associated with the channel. These buffers can hold request addresses, write data words, read data words, and other control information associated with channel transactions and can help improve memory throughput by supplying requests and write data to the memory, and receiving read data from the memory, in a pipelined fashion. The buffers can also improve memory throughput by allowing a memory scheduler 132 to exploit address locality to favor requests that target a memory page that is already open, as opposed to servicing a different request that forces that page to be closed in order to open a different page in the same memory bank.

Figure 5:
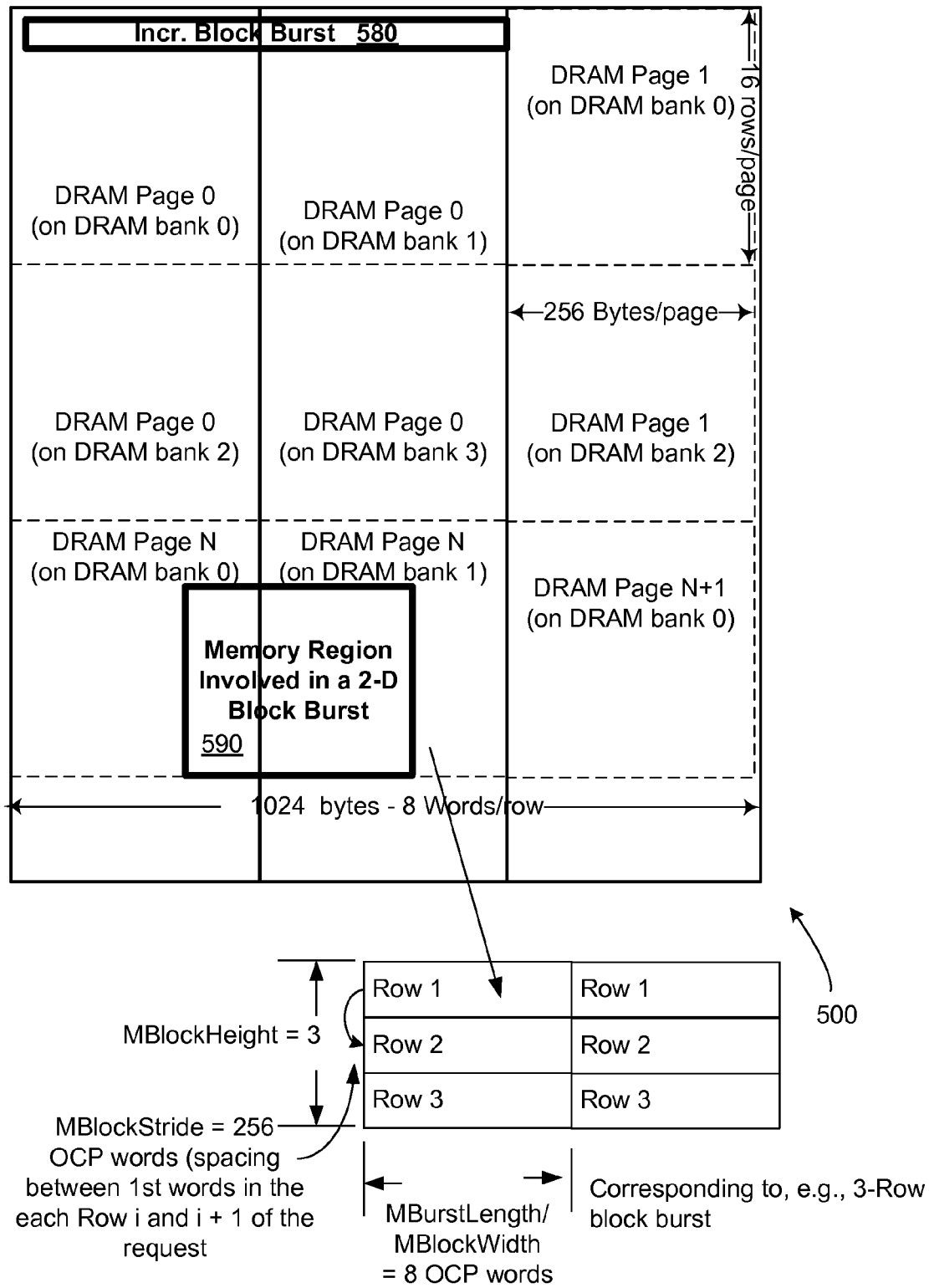
FIG. 5 illustrates an embodiment of a Memory Space of a 2-D bit map with one or more address regions of the address map allocated for a two-dimensional (2D) tiled burst request.

An initiator IP core itself and system software are decoupled from knowing the details of the organization and structure of the memory system when generating the addresses of requests going to memory targets. Requests from the initiator cores, such as a CPU 102, to perform memory operations can be address tiled into individual memory addresses by the memory scheduler 132. The address tiling translates system addresses in the memory map into real addresses of memory cells within a particular IP memory core or in some cases across a channel boundary similar to as shown in FIG. 5. Thus, the memory scheduler 132 may also decode/translate a system's memory target address sent in a request to determine a defined memory segment's actual physical location on a chip i.e. (Rank, bank, row and column address information) rather than its virtual address known to the rest of the system.

The memory scheduler 132 also supports user defined address tiling (see FIG. 7) on a per region basis. Each tiling function can be associated with a specified OCP MAddrSpace. The memory addressable through the memory scheduler 132 can then be mapped into the system address space as multiple regions (non-overlapping), with each having a unique tiling function. Tiling may be used in 2D memory page retrieval for 2-D block transaction optimization. The memory segments in the address space assigned to a first region having a unique tiling function used in the 2D memory page retrieval for the 2-D block request. Those memory segments are addressable through the memory scheduler 132.

The address map 136 of details of the organization and structure of the memory system exits in each initiator agent coupled to an IP core. The memory scheduler 132 schedules pending accesses in a channel-buffer, selecting one access during each DRAM command cycle, sending the appropriate command to the DRAM, and updating the state of the pending access. Note that a single memory access may require as many as three DRAM commands to complete. The memory channel then performs the requested accesses and returns one or more responses with the read data to a buffer. The target agent collects replies from the memory channels so they can be presented to the initiator core in the expected in-order response order.

Thus, the initiator cores 102-114 do not need hardware and software built in to keep track of the memory address structure and organization. The initiator cores 102-114 do not need a priori knowledge of the memory address structure and organization. The memory scheduler 132 has this information and isolates the cores from needing this knowledge. The memory scheduler 132 may receive a request sent by the initiator agent and translate the target address and channel route to rank, bank, row and column address information in the various memory channels/IP cores.

Also, the memory scheduler 132 with configurable address tiling functions supports receiving configurable configuration parameters from a user. The configurable configuration parameters flexibly support a multiple channel configuration that is dynamically changeable and enable a single already-designed System-on-a-Chip design to support a wide range of packaging or printed circuit board-level layout options that use different on-chip or external memory configurations by re-configuring tiling-to-region assignments to better support different modes of operation of a single package.

FIGS. 2-4 illustrate tables 1-3 of the configurable parameters selected by the user and stored in tiling registers in the memory scheduler. The two base registers are shown in Table-1 207 and then each more fully expounded in Table-2 309 and Table-3 411 correspondingly. The address tiling register for the address swapping operation is shown in Table-2 309. The address tiling register for the bank address operation is shown in Table-3 411. The address offset of each address tiling register is presented in Table-1 207.

The address tiling in the memory scheduler can be enabled by programming a set of tiling registers, where each tiling function is programmed into the register block 207, 309, 411. Table-2 309 and Table-3 411 denote the address bits in the first column and how to manipulate those bits in the other columns. Thus, the memory scheduler's tiling functions are configurable and can cater to multiple application domains requesting differently shaped data patterns from the memory at the same time in the same design.

Different initiator applications have different algorithms that create different shaped data structures and address tiling takes advantage of the property of the spatial principle of locality to store and retrieve data in the memory to maximize the efficiency of storing and retrieving this data. The system designer/user may know the typical request size or address increments based on that request size and the order in which request accesses typically occur in that instance of the integrated circuit design. Address tiling is the translation/transformation of the address bits in the request, such as the system address, to the physical address in the memory storing and subsequently retrieving of the data in stored the physical address of the memory. Address tiling optimizes for a memory page hit efficiency for accesses based on the typical access patterns of the data structures of the application generating the request seeking to obtain the stored data.

Figure 7:
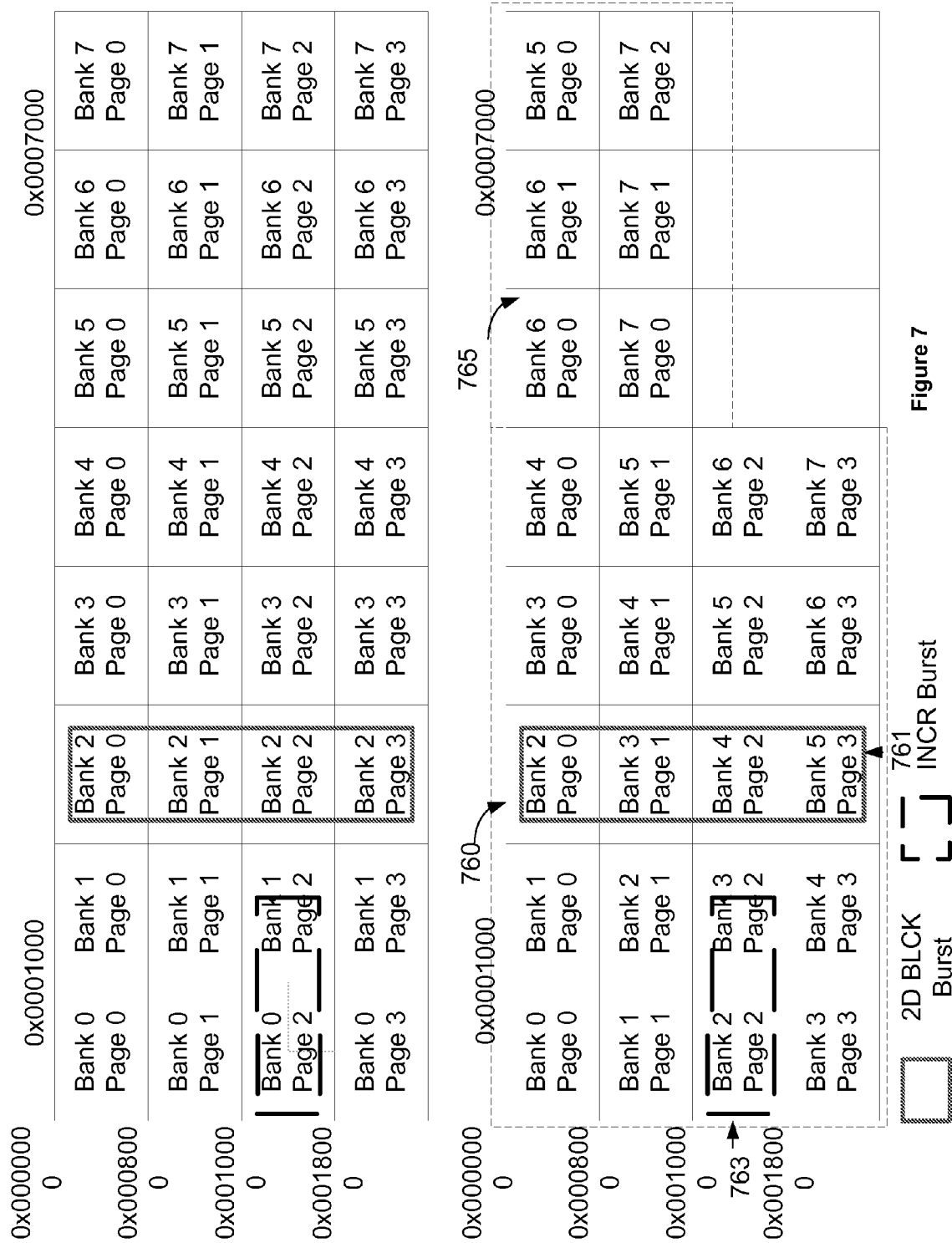
FIG. 7 depicts the un-tiled and tiled views of a 2D address map based on the un-tiled, incoming address values and the effect of applying an ADD type transformation for bank address selection, respectively.

Referring to FIG. 5 and FIG. 7, the different shaped data request can be square shaped rows and columns of data from the memory for example 16 by 16 in 2-D applications 590 or thin linear shaped rows and columns of data from the memory for example 1 by 256 in computer instruction applications 580 (See FIGS. 5 and 7). The address space assigned to a first memory region 760 in the first memory target has a configured tiling function to optimize two dimensional (2D) memory page retrieval for the 2-D block request and the address space assigned to a second memory region 765 in the first memory target could have a configured tiling function to optimize linear instruction memory page retrieval for incrementing block request. Both memory regions 760, 765 are addressable through the memory scheduler. Each region of memory 760, 765 consists of a dedicated set of unique address space in the memory.

The different regions 760, 765 in the address map are configured to store the different types of data/data objects in a completely application software transparent fashion. By defining the right size of granularity of each tiling function for a given region, then several requests will access a same memory bank before needing to cross into another bank boundary, thereby tying up this single memory resource for a couple of cycles rather than multiple memory resources for the same number of cycles. Plus, the page buffer in a first memory core will have previously accessed data in the memory interleave segment and correspondingly stored accessed data in the page buffers of each memory channel in the aggregate target. A single memory access may require multiple DRAM commands to get the desired data to the corresponding page buffers. Having the data in page buffers and reusing that data for several cycles, improves efficiency based on the principle of locality. Also, creating a tiling function for a given region of the memory at a coarse granularity/ bigger size can also take advantage of inter-thread parallelism and reduces the need to keep page buffers from multiple DRAM banks/channels servicing the need of a single request thread. Instead, a single page buffer of one DRAM bank may service that request thread for multiple cycles. Thus, setting the shape of a defined tiling function relative to a size of a typical data structure being stored in that region of the address map to take advantage of the principle of locality. If multiple discreet memory cores exist in the system and three requests down the line, the program/application in the initiator wants the same data as the first request, then that data should still be already stored in the page buffer of the first memory core eliminating some cycles of delay to repeat putting that data back into the page buffer of the memory.

Note, the principle of locality in computing is a concept that deals with the process of accessing a single resource multiple times. There are three basic types of locality that may be factored in: temporal; spatial; and sequential. Temporal Locality, i.e. locality in time, suggests if data or an instruction stored in memory is referenced, that same item will tend to be referenced again soon (e.g., loops, reuse). Spatial Locality, i.e. locality in space, suggests if data or an instruction stored in memory is referenced, items whose addresses are close by tend to be referenced soon. Sequential locality suggests that a memory is typically accessed sequentially by linear programs. Generally, data from linear programs that is related are stored in consecutive locations in memory and in the case of data from multi-dimensional objects that are related that data is stored in a block pattern in memory. The principle of locality is due in part to the manner in which computer programs are created. Designers and users can anticipate the types of programs using the systems memory and set up regions to maximize these principles.

Referring to FIG. 1, the programming of the set of tiling registers provide the user the opportunity to tile different address spaces with different tiling functions and thus, optimize the tiling functions as per application demands. The memory scheduler 132 has logic 123 that implements the address tiling functions and references the parameters in the tiling registers 119, 121. A range for the DRAM's page size and bank width (i.e. number of banks) in the DRAM can be part of the configuration parameters for the address tiling function in the tiling registers to thereby allow the user to use DRAMs with potentially different numbers of banks, different page sizes, support different burst lengths, than originally envisioned and simply program in the new configuration parameters for the characteristics of the DRAM actually being used in that instance of the integrated circuit.

The memory scheduler may support up to seven address tiling functions, identified by the Sys-OCP MAddrSpace signal value, which can vary from 1 through 7 to indicate each tiling function. Note that the MAddrSpace signal value=0 is reserved for accessing the configuration registers in the memory scheduler. The user can program up to seven address tiling functions into the tiling registers at runtime and all of the tiling functions may be functioning at the same time. Thus, the seven distinct tiling functions can co-exist during normal operations of the integrated circuit. Each tiling function is implemented in its own a discrete region of the memory, which applies that tiling function to at least requests and responses for data in that discrete region memory. The user can choose the tiling function for a given region that is most suitable for the application that is anticipated to be run, at runtime. Each tiling function consists of an address swapping stage and then a bank-address transformation stage but calculated in parallel with the address swapping stage. Each tiling function is specified by populating the fields of the two address tiling registers (examples shown in tables 2 and 3) in the memory scheduler. The first register is used to specify the address swapping parameters, and the second register is used to specify the bank-address transformation parameters.

Referring to Table-1, the gap between any two registers in the address offset specified in Table 1. This is done so that the registers can be expanded in the future, if required.

Figure 6:
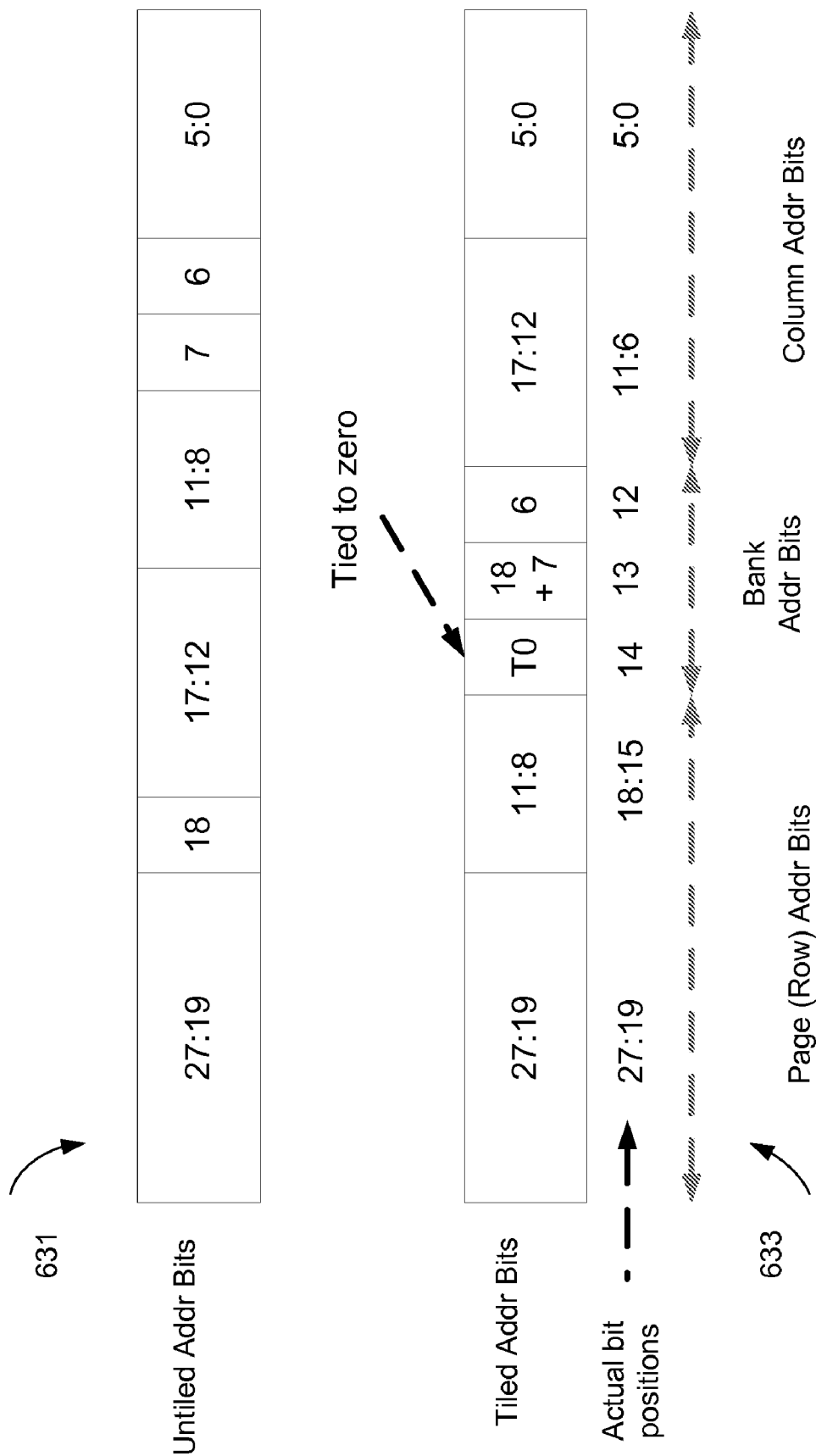
FIG. 6 illustrates each tiling function consists of the address swapping stage and/or the bank-address transformation stage occurring on an address in a request.

FIG. 6 illustrates each tiling function consists of the address swapping stage and/or the bank-address transformation stage occurring on an address in a request. As discussed, the first register in the tiling registers is used to specify the address swapping parameters and a second register is used to specify the bank-address transformation parameters and the bank address transformation calculation is performed in parallel with the address swapping.

As discussed, in each tiling function, address bits are re-arranged by a first transformation operation of Address Swapping in groups and at one or two different places. For example, as shown in FIG. 6, bits in positions 11 thru 8 in the un-tiled address 631 are shifted to bits in positions 18 thru 15 in the tiled address 633. Similarly, bits in positions 17 thru 12 in the un-tiled address 631 are shifted to bits in positions 11 thru 6 of the tiled address 633. The second-type of transformation pertains to the selection of the bank bits (referred to as a "Bank-Address Operation" or BAOP). This transformation can happen in multiple bits among the bank address bits. For instance, bit 14 of the tiled bank address 633 bits is tied to 0, indicating that only two bank bits (bits 13 and 12 can form any Boolean combination correspondingly 4 banks) are used in the system. The BAOP function also causes the value of the bit in the 13th position of the tiled bank address bits 633 to be obtained by performing a Boolean ADD of the bits in the 18th and 7th position of the un-tiled address 631 and obtaining the LSB of the sum. The operations of which position bits to swap as a group and which bits to perform the Boolean BAOP function on is programmed into the address tiling registers. However, the bits used in the BAOP were different from the position bits used in the address swap. Thus, the tiling registers are defined in such to perform a tiling function of a first operation of address bit swapping in the incoming address of the first request, which is used to improve page hit rates of block bursts, and then a second operation of applying a Boolean logic function, such as an ADD, XOR, etc., that manipulates bank address bits in the incoming address of the first request, which is used to minimize back to back page misses to the same bank.

On further analysis, we also found that the Bitwise-Masking-Add-Modulo (BAM) function is extremely flexible for bank-address operations and could also be used to obtain a "checker board" type addressing pattern (See FIG. 7 region 760).

The first swapping transformation operation is used to re-order the address bits of an un-tiled address into a more memory friendly address for the type of application anticipated to be using that region of the memory and the Boolean logic performed on the bank address bits is an ADD function used to select a different bank in the event of a page miss, such that page pre-charge costs are reduced, and both swapping operations are configurable from a user.

The address swapping operation accounts for different stride values used in requests and increases page hits to ensure that a page miss moves the DRAM to charge up data to retrieve from a new bank. Thus, maximizes page hits in the DRAM memory and minimizes DRAM page misses and thereby eliminates lost cycles associated with the pre-charge stage of a page miss.

In general, an address such as FIG. 7 showing bits in the 0 thru 27th position can be broken down into multiple segments by specifying the length of each segment. The address can then be defined as a concatenation of an ordered set of segments S={S0, S1, S2, S3, S4, S5} where each SM (where M is an integer from 0 to 5) is an address segment and has an associated length LM. In other words, the address can be reconstructed by concatenating the segments such that the LSB of Segment0 denotes the LSB of the un-tiled address, and most significant bit (MSB) of Segment5 denotes the MSB of the un-tiled address.

The following rules guide the address swapping transformation:

The user is allowed to divide the address into at most 6 segments.

The segments are contiguous, such that the ordered concatenation of the segments will construct the swapped address.

The segments are mapped in a one-to-one fashion to the un-tiled address. However, due to swapping, one may not be able to reconstruct the un-tiled address by concatenating the segments.

Assume that the user divides the address into N ($\leq 6$) segments.

A segment S0 has an LSB given by LSB0 at bit location 0, and a length L0? log(DRAM_BLOCK size in bytes)

A segment SM (where 0<M<N) has an LSBM given by LSBM=LSBM-1+LM-1

For the last segment SN-1, the LSB and length are given by LSBN-1=LSBN-2+LN-2, and LN-1=CHIP_BIT_LSB−LSBN-1

For each segment, an associated bit position denotes its LSB location in the Sys OCP address. A bit position must be specified for each segment, except S0. Integers ILOC1 through ILOC5 denote the LSB location of the segments S1 through S5 in the Sys OCP address, respectively. The Sys OCP bit position ILOC0 corresponding to S0 is always 0 (i.e., LSB0).

Based on the above, the swapped address can be generated as follows: Given N, Sys-OCP MAddr and CHIP_BIT_LSB, L0 to LN-2, and ILOC1 to ILOCN-1.

The tiling logic may implement a swapping operation algorithm as follows:

Swapped_Addr[L0-1:0]=Sys-OCP MAddr[L0-1:0];
LSB0=0;
FOR EACH integer M, where 0<M<N:
 LSB$_M$=LSB$_M$-1+L$_M$-1;
 IF (M equals N-1): L$_M$=CHIP_BIT_LSB−LSB$_M$;
 Swapped_Addr[LSB$_M$+L$_M$-1: LSB$_M$]=Sys-OCP MAddr[ILOC$_M$+L$_M$-1: ILOC$_M$];
Swapped_Addr[MAddr width−1:CHIP_BIT_LSB]=Sys-OCP MAddr[MAddr width−1:CHIP_BIT_LSB];

Bank address transformation is provided only for bank selection. The ADD function performs bank address transformation to allow retrieving data across more banks, numbers 0-7 verses 0-1, if add function was not present to allow four variables to transform to the same input address bit. The idea is to provide a flexible Bitwise_masking-ADD-Modulo (BAM) function. A maximum of 8 banks are supported (i.e., BAOP.width can be configured to be 1, 2, or 3 if BANK8 is set to 1, and 1 or 2 if BANK8 is set to 0). The ADD function uses a high order bit and a bit from the LSB section for the ADD function. The BAM function is defined as follows (where K is the starting tiled, bank address bit position):

Tiled Mem-OCP MAddr[BAOP.low_loc+BAOP.
 width−1:BAOP.low_loc]=Sys-OCP_Addr[K+
 BAOP.width−1:K].

The next calculation maybe as follows:

Tiled Mem-OCP MAddr[K+BAOP.width−1:K]=LSB
 BAOP.width bits of ((BAOP.high_en & Untiled
 Sys-OCP MAddr[BAOP.high_loc+BAOP.width−
 1:BAOP.high_loc])+(BAOP.low_en & Untiled
 Sys-OCP MAddr[BAOP.low_loc+BAOP.width−
 1:BAOP.low_loc]))

In the equation above, BAOP.high_en, and BAOP.low_en are BAOP.width wide. The enable bits indicate which bits should be enabled for the bank-address transformation function. The BAOP.high_loc denotes the LSB of the higher order bits to be used in the function, and BAOP.low_loc denotes the LSB of the lower order bits for the function. The value K denotes the starting bit location of the tiled, bank address bits and it is denoted by the existing bank_bit_location parameter.

Thus, the configuration parameters for the second tiling register controlling the ADD function allow parameters for a starting bit location of the tiled address, low and high order bank address bits, and bank width (number of banks).

The tiling logic in the memory scheduler is also configured to recognize an incoming request having address bits or a request pattern that the logic in the memory scheduler recognizes as not needing the address tiling function applied FIG. 7 depicts the un-tiled and tiled views of a 2D address map based on the un-tiled, incoming address values and the effect of applying an ADD type transformation for bank address selection, respectively. Two dataflow request examples are also presented in the context of a 2D BLCK burst 761 and an INCR burst 763 accessing the address map (indicated by a red box and a dashed black box, respectively). The top part of the figure depicts the effect when a pass-through tiling (i.e., no tiling) is used, and the bottom part of the figure depicts the effect when a BAM bank-address operation tiling function is used. The map shows the general case of eight banks and applies the following tiling transformation:

Tiled_Bank_Addr_Bits[2:0]=(Untiled_Bank_Addr_Bits[2:0]+Untiled_Page_Addr_Bits[2:0])%8

Applying the transformation on the bank and page address bit locations shown in FIG. 6:

Tiled_Addr_Bits[14:12]=Untiled_Addr_Bits[14:12]+Untiled_Addr_Bits[17:15]

It means that the tiled bank # is set to "the un-tiled bank #+the un-tiled page #, and then modulo by 8 (choose the least significant 3 bits)".

To get the tied-to-zero result as displayed in FIG. 6, we can apply a bitwise masking operation to each of the operands before performing the BAM operation.

In this discussion, the lower order bits used in the bank address function are referred to as BAOP.low bits (Untiled_Addr_Bits[14:12]), and the higher order bits used in the function as BAOP.high bits (Untiled_Addr_Bits[17:15])

In FIG. 7, the narrow rectangular box denotes a 2D BLCK burst 761. The ideal case is when the entire 2D block accesses the same page. However, this may not be possible due to the limited page size. The tiling function in the figure depicts a 2D block that must cross pages. Note that due to the application of the tiling function, the addresses either go to the same page in the bank (within each page), or go to a different page in a different bank (when crossing a page boundary either horizontally or vertically), thus minimizing any page miss overhead. Also note that a regular INCR burst request 763 shown by a rectangle also does not cause a page miss when crossing page boundary.

The checker-board like pattern shown in memory region 760 in the bottom view of FIG. 7 can be obtained at different levels of granularity. If we choose lower order bits instead of the current BAOP.low bits (e.g., Untiled_Addr_Bits[14:12]), we would obtain a checker-board where bank changes occur more frequently in the horizontal direction. On the other hand, if we choose a higher-order bit instead of the current BAOP.high bits (Untiled_Addr_Bits[17:15]), we would obtain a checker-board where the banks do not change very frequently. Also, the choice of different operand bits leads to different memory access patterns. In the example provided, the banks hop by 1 in the horizontal and vertical directions. The user/designer may also design a tiling function where the banks hop by a different number in either the vertical direction, or the horizontal direction, or both. The choice of the checker board depends on the addressing pattern of the application.

FIG. 5 illustrates an embodiment of a Memory Space of a 2-D bit map with one or more address regions of the address map allocated for a two-dimensional (2D) tiled burst request. One or more regions of the address map 500 are allocated for a two-dimensional (2D) tiled burst request that have rules adhering and maximizing performance for block memory page requests so that pixels all around a given pixel, left right up and down from the target pixel, are kept available to fulfill the two dimensional tiled request. A tiling function may be a specified arbitrary swap of address bits available to the target.

The memory region 590 involved in a block burst may fulfill an example, e.g., 3-Row 2-Dimensional OCP burst. The burst has a MBlockStride attribute=256 OCP words indicating the spacing between 1st words in Row i and Row i+1. The burst has a MBurstLength/MBlockWidth=8 OCP words. The burst has MBlockHeight attribute=3 rows. The tiling example has a 4-bank configuration, 4 KB pages (1024×32b), and 1024 B/row, such as DRAM Page 0 on DRAM bank 0, DRAM Page 0 on DRAM bank 1, DRAM Page 0 on DRAM bank 2, DRAM Page 0 on DRAM bank 3, and wrapping again. One page buffer may be open in each discreet DRAM bank to store the block memory page request.

In the diagram, the memory channels divide the bit map into columns. The memory channels set at the size granularity of a memory page and are interleaved from 4 discrete DRAM banks/IP cores. The interleaved memory channels are configured for optimized 2D performance and are allocated to a region in the address map all by themselves.

This allocated region of the address map for 2D tiled request has rules adhering and maximizing performance for block memory page requests so that pixels all around a given pixel left right up and down from a target pixel are available in the same retrieved memory page. The tiling function changes the mapping structure of assigned addresses in a request to real memory address of the region to optimize a 2D block memory request. Further, page buffers may be open in each discreet DRAM bank to store the previous block memory page request, the current block memory page request, and the predicted future block memory page request. Traditional linear layout of bank, row, and column address bits for DRAM good for incrementing/wrapping bursts, i.e. cache line refills. Assigned tiled address regions for 2D data structures storage and retrieval (e.g. MPEG macro blocks) is good for 2D block requests. The assigned tiled address regions for 2D data tends to eliminate page miss for each row in macro block. Many consumer digital products improve situation by translating (transposing) address bits in path to DRAM, making rectangular pages from application. Such devices often support multiple organizations based on address aliasing to do address tiling translation.

The interconnect and memory scheduler provide a solution for address tiling and supports 2D transactions as defined by Open Core Protocol.

The DRAM address organization is changed from a linear approach in the 2D tiled space in this allocated region. The assigned address is translated to actual system address structure may be for example: <row[r:2]> <bank[1]> <col[9:6]> <row[1:0]> <bank[0]> <col[5:0]>. Thus, in the address bits of a 2D burst request the fields corresponding to the above coordinates may be bits in fields 0-5 of the address correspond to width of the columns col[5:0] in DRAM banks 0 or 1, bit in fields 6 of the address correspond to DRAM bank 0 or 1, bits in fields 7-8 of the address correspond to the stride of the rows in DRAM banks 0 or 1, etc.

The memory addressable through the memory scheduler can then be mapped into the system address space as multiple regions (non-overlapping), with each having a unique tiling function. Tiling may be used in 2D memory page retrieval. A request retrieves a block of memory addresses forming the 2D memory page retrieval. Up to 2 tiling equations may exist per target agent connected to the memory scheduler. The address regions are associated with a target MAddrSpace by use of the address_space parameter for each region. Target cores may associate a unique tiling function to each address space. The target addressable range can then be mapped into the system address space as multiple regions (non-overlapping), with each having a unique tiling function. Boot configurability of region addr_space parameters may be useful. In the tiling equation an arbitrary permutation of bits Maddr may occur. The low-order 64 Bytes in an address region are not tiled. The tiling does not impact memory channel selection. The tiling occurs after channel decoding. The chopping logic ensures each chopped portion of 2D request does not have a MBurst-Stride that crosses a vertical channel DRAM page boundary. The tiling equations may be re-programmed. The ability to perform multiple user specified address tiling functions in the target agent or memory scheduler exists. A tile_func parameter in the address regions so an internal tiling function can be specified independently of socket MAddrSpace. Address tiling makes 2D-type transactions far more efficient by reducing page miss rate.

In an embodiment, one page buffer may be open in each discreet Dynamic Random Access Memory (DRAM) bank to store the previous block memory page request, the current block memory page request, and the predicted future block memory page request. In memory systems, a memory page is a fixed number of bytes recognized by the DRAM organization such as a entire row of memory cells across a DRAM bank, which is subsequently accessed in a page buffer for that DRAM bank.

Figure 8:
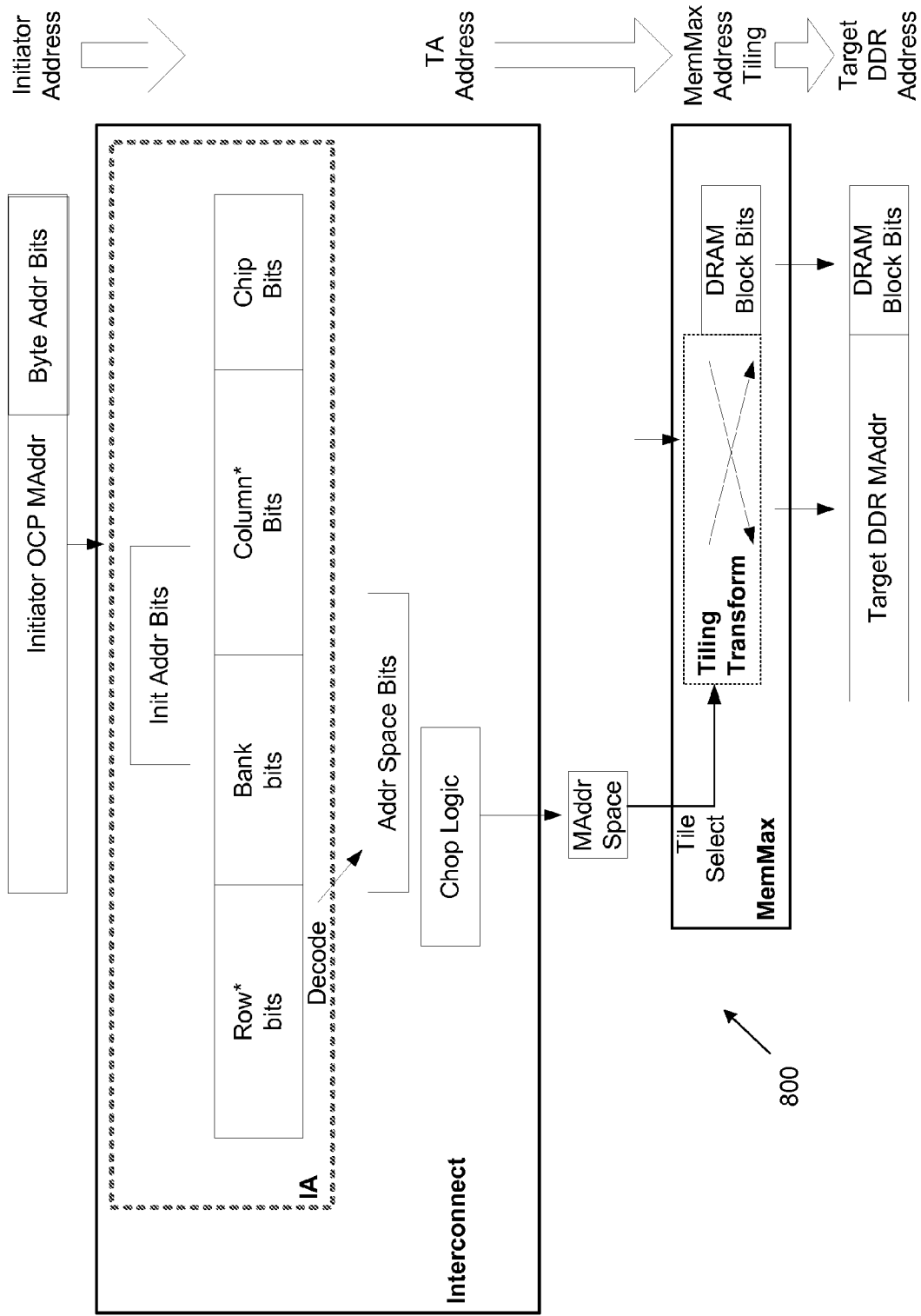
FIG. 8 illustrates a flow diagram of an address translation flow for an example address tiling.

FIG. 8 illustrates a flow diagram of an address translation flow for an example address tiling. A possible address translation flow 800 occurs starting from the initiator side, going through an optional address-filling-in operation at the initiator agent, going through the address decoding at the initiator agent, delivering to a channel target, coming out of the interconnect with a proper MAddrSpace, going through a target side memory scheduler module using one of the user defined tiling transform functions, where the address swapping and bank selection occur in parallel, and, at the end, reaching the IP memory core target. In the middle, chopping logic may chop burst request to fit better within the DRAM organization. The memory scheduler supports user defined address tiling. Each tiling transform function will be associated with a specified OCP MAddrSpace. The memory addressable through the memory scheduler can then be mapped into the system address space as multiple regions non-overlapping, with each having a unique tiling function.

In the memory scheduler, we have a choice of implementing the tiling function either (1) before the requests has been chopped to DRAM_BLOCK_SIZE, or (2) after the request chopping has taken place. When tiling is done in the former case, address tiling can break the continuity in a Sys OCP burst, thus requiring additional chopping. If tiling were done before request chopping, the memory scheduler would have had to chop the INCR sequence once due to tiling, and then again into DRAM_BLCK_SIZE chunks. However, by performing address tiling after request chopping, and restricting that all the bits involved in tiling transformations (address swapping and bank-address operation) are above the DRAM_BLOCK byte size, the memory scheduler can ensure that additional chopping will not be necessary.

From a DRAM perspective, DRAM_BLOCK determines the number of bytes of data returned in one DRAM burst-length. Therefore, the DRAM utilization can be maximized by keeping the requests within the DRAM_BLOCK together, so that only one CAS latency overhead is incurred. Therefore, forcing the tiling functions to be configured only above the DRAM_BLOCK bits does not hurt the performance.

The DRAM block size is determined by how wide the data width of each word coming from the memory controller is mapped to the DRAM burst length of that DRAM and how much faster a cycle of the memory controller is operating at to the operating cycle of the DRAM. Here is how DRAM Block size works. The scheduler issues requests to the controller in a short, configurable DRAM block size that is set to match the DRAM burst length, with the difference in operating speed between the memory scheduler and DRAM factored in. A DRAM controller issues transactions such that one transaction returns say 16 bytes of data. Now, if the data width between the controller and the DRAM is 2 bytes (16 bits), that means that the memory scheduler chops an incoming burst request to issue new burst requests with a burst length of 8 (2 bytes per the 8 request for data in the burst=16 bytes of data) returned back to the controller. These 16 bytes are mapped back to the memory scheduler. Likewise, if the OCP data width is 4 bytes, the memory scheduler will issue bursts with burst length 4 (=DRAM_BLOCK_SIZE), which will now correspond to one transaction in the DRAM controller.

The tiling logic restricts that all the address bits involved in tiling transformations (address swapping and bank-address operation) are not swapped because they are below the DRAM_BLOCK bits position in the address, or above the address bits of the LSB of the chip bits position in the address.

The memory scheduler tiling operation is performed by first applying the address swapping transformation, followed by the bitwise-masking-then-ADD transformation for bank selection. In order to provide the required flexibility in address tiling, a total of seven tiling functions, including a range of three to seven, can be specified at design time, which can be re-programmed at runtime by writing to the corresponding register fields. The choice of the tiling function to be used is decided by the Sys address space (MAddrSpace) value corresponding to each tiling function. Tiling functions are specified by programming corresponding registers in the memory scheduler.

Finally, address tiling is specific to each DRAM chip. Thus, Address tiling is defined on a per chip basis. Therefore, all tiling transformations are done below the LSB of the locations of the chip bits. The LSB of chip bits is calculated as:

CHIP_BIT_LSB=Sys ADDR_WIDTH−CHIP_BIT_LOCATION−CHIP_BITS.

Figure 9A:
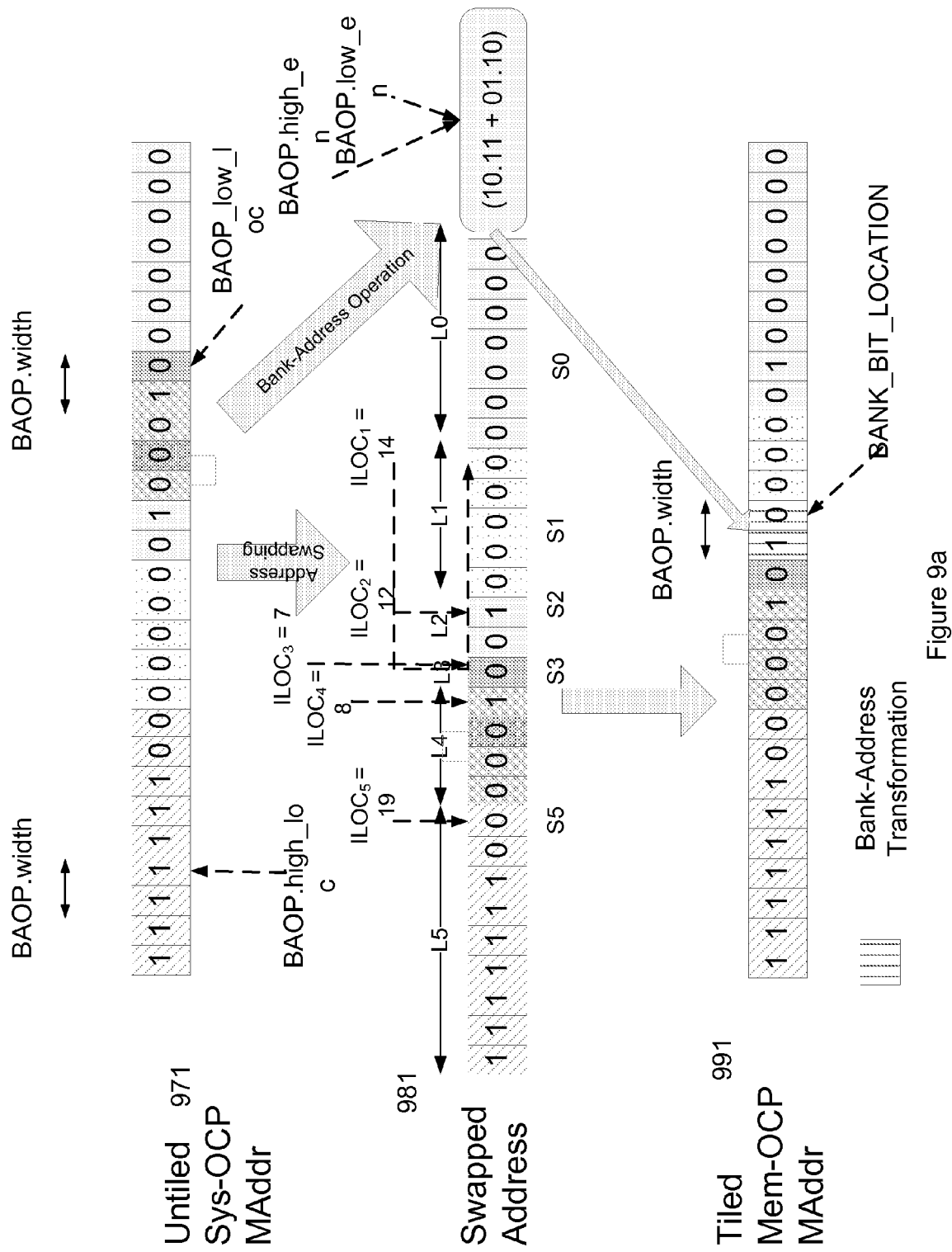
FIG. 9a illustrates an address tiling function applied to an address in a request to obtain the physical address in the DRAM.

FIG. 9a illustrates a tiling function applied to an address in a request to obtain the physical address in the DRAM. FIG. 9a presents an example to illustrate the two stage tiling operation. Assume an un-tiled incoming address 971 given by 0xFE01100. Assume the bank_bit_location parameter is set to 12, bank8 parameter is set to 0, chip_bit_location is set to 27, and both Sys and Mem OCP addr_wdth is set to 28. FIG. 9b illustrates Table-6 900 showing a register block programmed for this address tiling function for the first memory region 760 in the target DRAM.

In the first stage, the address swapping transformation is invoked. The address swapping transformation is performed before the bank address transformation, but the bank address transformation is calculated in parallel with the address swapping transformation. The final tiled address 991 generated by the address tiling logic is obtained by replacing bank select bits in the swapped address 981 by those obtained from the bank-address transformation. The transformations are demonstrated in the picture by appropriate color coding. Note that both transformations are specified with respect to the original un-tiled address 971. In other words, the value of BAOP.high_loc=24, represents the bit at location 24 in the un-tiled address 971, and not in the address that has undergone swapping. If N tiling functions are configured, and the rest are not configured and RO, the N tiling functions must be configured for addrspace 1 through N, contiguously. The example tiling functions shape traffic and obtains higher memory throughput. The tiling function was applied to the incoming address to the tiling module to generate the tiled outgoing address.

FIG. 10 illustrates Table-4 with an example address tiling function to improve DRAM utilization for a 2D BLCK burst. The idea is to increase the possibility of page hit for consecutive memory accesses. The example following DRAM organization: an incoming address is decomposed by the DRAM controller into pages (rows), banks, and columns as follows:

<MADDR[27:13]><MADDR[12:10]><MADDR[9:0]>, where <MADDR[27:13]> represents the page address, <MADDR[12:10]> represents the bank address, and <MADDR[9:0]> represents the column address.

The incoming 2D BLCK burst addresses are single word rows, where MBlockStride is 0x10000 bytes shown in Table-4 1000.

With the un-tiled addresses, the DRAM causes a page miss for each transfer of the BLCK burst—this is demonstrated in the second column on the left half of Table-4. In this example, the tiling function programmed into the memory scheduler utilizes a simple tiling function that interchanges incoming address bits 16 through 19 with bits 4 through 7, to become the new tiled address, before deciding the DRAM bank address, page address, and column address. As shown on the right half in table-4 the new tiled addresses (the 5th column) increase the page hits to 3 out of the four transfers because all four transfers are targeting at the same page on the same bank. The first transfer is considered a miss as the bank was assumed closed at the time of the initiation of the transfer.

In addition to swapping of the bits, address tiling can also be achieved by applying a transformation function on the incoming address so that memory pages on different banks can be accessed, especially for application transactions with a big memory footprint that access different pages. The transformation for bank selection that can be used is the ADD and XOR functions that have the property of generating a checker-board like access pattern, which is very suitable for achieving high bandwidth from the DRAM.

In the absence of address tiling support in hardware in the memory scheduler, address tiling would have to be done by software. This would require that the software is aware of the details of the non-software-transparent memory organization, which can be quite cumbersome for the software developers. Plus, the benefit of software-hardware decoupling is lost. Hence, by supporting address tiling in the memory scheduler, software developers can work with a virtual memory organization, and not worry about how that would map to the physical memory. However, even in hardware, it is important to know the application address pattern in order to apply address tiling effectively. The example illustrated in Table-4 works well for the given address pattern, but may not work well for other address patterns. Hence, the register and logic hardware in the memory scheduler has the user configurable registers to support multiple tiling functions, each catering to a given address pattern.

Figure 11:
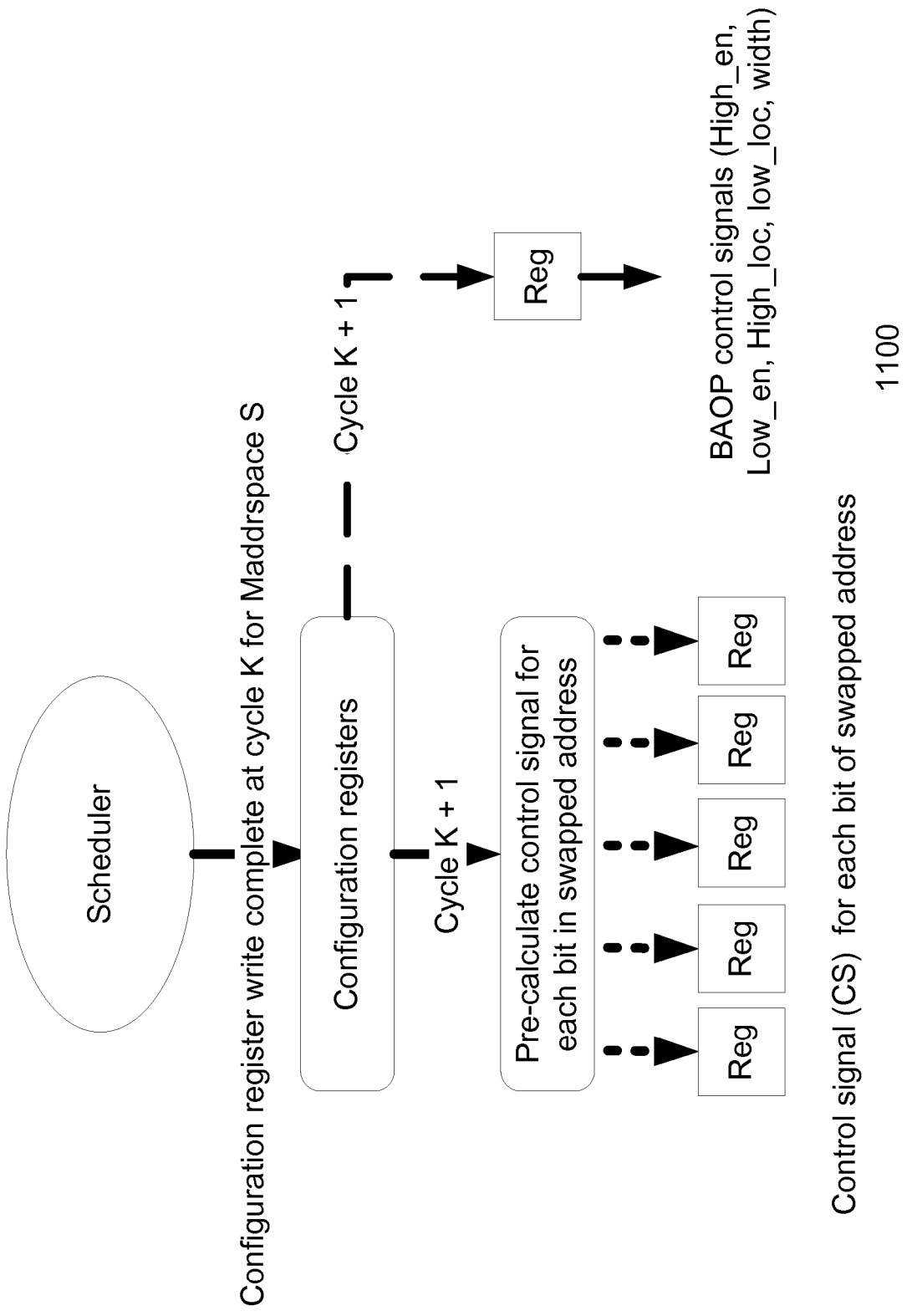
FIG. 11 illustrates a high level architecture for a control bit calculation.

FIG. 11 illustrates a high level architecture for control bit calculation. Address tiling is performed at the Mem clock domain, and must be sensitive to the timing requirements of 533 MHz or greater at the Mem clock. A control signal per bit of swapped address may be used to determine the target location of a bit in the OCP address in the swapped address. The control bit should be pre-calculated during the programming of the configuration registers, such that the actual tiling of the addresses can be relieved of the overhead. The top part of the figure depicts the step when a write to the configuration register takes place. Assuming that the write to the configuration register is completed at clock cycle K, at cycle K+1 the control signals for generating the swapped address are pre-calculated. Keeping the timing requirements of the memory scheduler in mind, this path should be made multi-cycle. The control signal calculation algorithm is described as above. The first and last FOR loops denote the portion of the address that are not swapped because they are below the DRAM_BLOCK bits, or above the CHIP_BIT_LSB. Hence, the control signals (CS) for these bits are the bits themselves. Apart from that, there will be N−1 FOR loops (where N is the number of segments) to determine the control signal for each bit in the swapped address.

Since address tiling depends on BAOP, SWAP, BANK_BIT_LOCATION, CHIP_BIT and CHIP_BIT_LOCATION, the pre-calculation logic for BAOP and SWAP corresponding to a given addrspace should be enabled whenever either or both are writable, or any register field of DRAMCONFIG register is writable.

Figure 12:
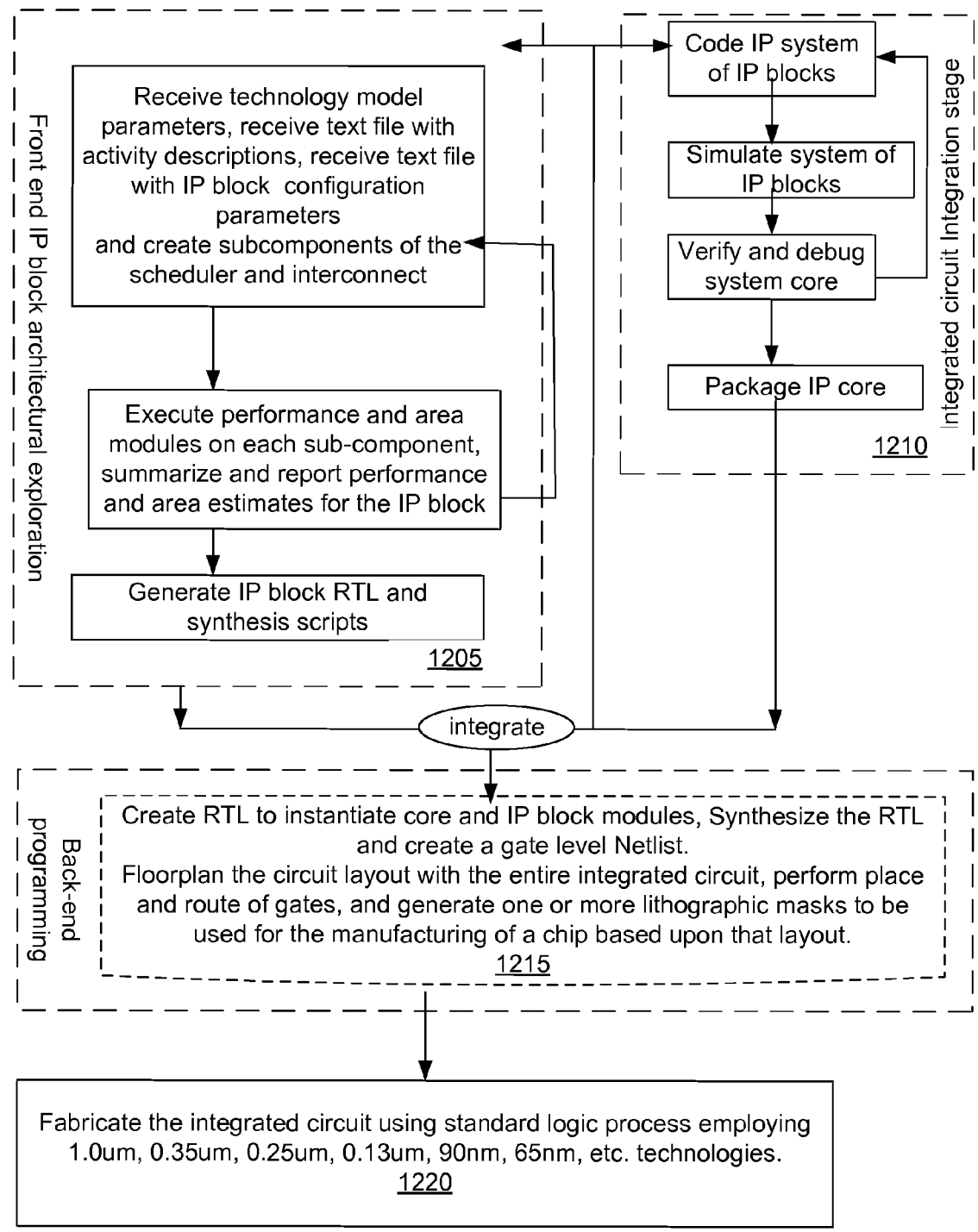
FIG. 12 illustrates a flow diagram of an embodiment of an example of a process for generating a device, such as a System on a Chip, with the designs and concepts discussed above for the Interconnect and memory scheduler.

An example algorithm to pre-calculate tiling control signals may be as follows:
SET X=0
CALCULATE LSB from the Swpping operation algorithm
FOR (I=0; I<LEN0; I++)
CS[I]=I;
END FOR
FOR (I=0; I<LEN$_1$; I++)
CS[LSB$_1$+I]=ILOC$_1$+I
END FOR
FOR (I=0; I<LEN$_M$; I++)
CS[LSB$_M$+I]=ILOC$_M$+I
END FOR
FOR (I=CHIP_BIT_LSB; I<MADDR_WIDTH−1; I++)
CS[I]=I;
END FOR FIG. 12 illustrates a flow diagram of an embodiment of an example of a process for generating a device, such as a System on a Chip, with the designs and concepts discussed above for the Interconnect and Memory Scheduler. The example process for generating a device with from designs of the Interconnect and Memory Scheduler may utilize an electronic circuit design generator, such as a System on a Chip compiler, to form part of an Electronic Design Automation (EDA) toolset. Hardware logic, coded software, and a combination of both may be used to implement the following design process steps using an embodiment of the EDA toolset. The EDA toolset such may be a single tool or a compilation of two or more discrete tools. The information representing the apparatuses and/or methods for the circuitry in the Interconnect Memory Scheduler, etc. may be contained in an Instance such as in a cell library, soft instructions in an electronic circuit design generator, or similar machine-readable storage medium storing this information. The information representing the apparatuses and/or methods stored on the machine-readable storage medium may be used in the process of creating the apparatuses, or representations of the apparatuses such as simulations and lithographic masks, and/or methods described herein.

Aspects of the above design may be part of a software library containing a set of designs for components making up the scheduler and Interconnect and associated parts. The library cells are developed in accordance with industry standards. The library of files containing design elements may be a stand-alone program by itself as well as part of the EDA toolset.

The EDA toolset may be used for making a highly configurable, scalable System-On-a-Chip (SOC) inter block communication system that integrally manages input and output data, control, debug and test flows, as well as other functions. In an embodiment, an example EDA toolset may comprise the following: a graphic user interface; a common set of processing elements; and a library of files containing design elements such as circuits, control logic, and cell arrays that define the EDA tool set. The EDA toolset may be one or more software programs comprised of multiple algorithms and designs for the purpose of generating a circuit design, testing the design, and/or placing the layout of the design in a space available on a target chip. The EDA toolset may include object code in a set of executable software programs. The set of application-specific algorithms and interfaces of the EDA toolset may be used by system integrated circuit (IC) integrators to rapidly create an individual IP core or an entire System of IP cores for a specific application. The EDA toolset provides timing diagrams, power and area aspects of each component and simulates with models coded to represent the components in order to run actual operation and configuration simulations. The EDA toolset may generate a Netlist and a layout targeted to fit in the space available on a target chip. The EDA toolset may also store the data representing the interconnect and logic circuitry on a machine-readable storage medium.

Generally, the EDA toolset is used in two major stages of SOC design: front-end processing and back-end programming. The EDA toolset can include one or more of a RTL generator, logic synthesis scripts, a full verification testbench, and SystemC models.

Front-end processing includes the design and architecture stages, which includes design of the SOC schematic. The front-end processing may include connecting models, configuration of the design, simulating, testing, and tuning of the design during the architectural exploration. The design is typically simulated and tested. Front-end processing traditionally includes simulation of the circuits within the SOC and verification that they should work correctly. The tested and verified components then may be stored as part of a stand-alone library or part of the IP blocks on a chip. The front-end views support documentation, simulation, debugging, and testing.

In block 1205, the EDA tool set may receive a user-supplied text file having data describing configuration parameters and a design for at least part of a scheduler having multiple tiling functions. The data may include one or more configuration parameters for that IP block. The IP block description may be an overall functionality of that IP block such as an Interconnect, memory scheduler, etc. The configuration parameters for the Interconnect IP block and scheduler may include parameters as described previously.

The EDA tool set receives user-supplied implementation technology parameters such as the manufacturing process to implement component level fabrication of that IP block, an estimation of the size occupied by a cell in that technology, an operating voltage of the component level logic implemented in that technology, an average gate delay for standard cells in that technology, etc. The technology parameters describe an abstraction of the intended implementation technology. The user-supplied technology parameters may be a textual description or merely a value submitted in response to a known range of possibilities.

The EDA tool set may partition the IP block design by creating an abstract executable representation for each IP sub component making up the IP block design. The abstract executable representation models TAP characteristics for each IP sub component and mimics characteristics similar to those of the actual IP block design. A model may focus on one or more behavioral characteristics of that IP block. The EDA tool set executes models of parts or all of the IP block design. The EDA tool set summarizes and reports the results of the modeled behavioral characteristics of that IP block. The EDA tool set also may analyze an application's performance and allows the user to supply a new configuration of the IP block design or a functional description with new technology parameters. After the user is satisfied with the performance results of one of the iterations of the supplied configuration of the IP design parameters and the technology parameters run, the user may settle on the eventual IP core design with its associated technology parameters.

The EDA tool set integrates the results from the abstract executable representations with potentially additional information to generate the synthesis scripts for the IP block. The EDA tool set may supply the synthesis scripts to establish various performance and area goals for the IP block after the result of the overall performance and area estimates are presented to the user.

The EDA tool set may also generate an RTL file of that IP block design for logic synthesis based on the user supplied configuration parameters and implementation technology parameters. As discussed, the RTL file may be a high-level hardware description describing electronic circuits with a collection of registers, Boolean equations, control logic such as "if-then-else" statements, and complex event sequences.

In block 1210, a separate design path in an ASIC or SOC chip design is called the integration stage. The integration of the system of IP blocks may occur in parallel with the generation of the RTL file of the IP block and synthesis scripts for that IP block.

The EDA toolset may provide designs of circuits and logic gates to simulate and verify the operation of the design works correctly. The system designer codes the system of IP blocks to work together. The EDA tool set generates simulations of representations of the circuits described above that can be functionally tested, timing tested, debugged and validated. The EDA tool set simulates the system of IP block's behavior. The system designer verifies and debugs the system of IP blocks' behavior. The EDA tool set tool packages the IP core. A machine-readable storage medium may also store instructions for a test generation program to generate instructions for an external tester and the interconnect to run the test sequences for the tests described herein. One of ordinary skill in the art of electronic design automation knows that a design engineer creates and uses different representations, such as software coded models, to help generating tangible useful information and/or results. Many of these representations can be high-level (abstracted and with less details) or top-down views and can be used to help optimize an electronic design starting from the system level. In addition, a design process usually can be divided into phases and at the end of each phase, a tailor-made representation to the phase is usually generated as output and used as input by the next phase. Skilled engineers can make use of these representations and apply heuristic algorithms to improve the quality of the final results coming out of the final phase. These representations allow the electric design automation world to design circuits, test and verify circuits, derive lithographic mask from Netlists of circuit and other similar useful results.

In block 1215, next, system integration may occur in the integrated circuit design process. Back-end programming generally includes programming of the physical layout of the SOC such as placing and routing, or floor planning, of the circuit elements on the chip layout, as well as the routing of all metal lines between components. The back-end files, such as a layout, physical Library Exchange Format (LEF), etc. are generated for layout and fabrication.

The generated device layout may be integrated with the rest of the layout for the chip. A logic synthesis tool receives synthesis scripts for the IP core and the RTL design file of the IP cores. The logic synthesis tool also receives characteristics of logic gates used in the design from a cell library. RTL code may be generated to instantiate the SOC containing the system of IP blocks. The system of IP blocks with the fixed RTL and synthesis scripts may be simulated and verified. Synthesizing of the design with Register Transfer Level (RTL) may occur. The logic synthesis tool synthesizes the RTL design to create a gate level Netlist circuit design (i.e. a description of the individual transistors and logic gates making up all of the IP sub component blocks). The design may be outputted into a Netlist of one or more hardware design languages (HDL) such as Verilog, VHDL (Very-High-Speed Integrated Circuit Hardware Description Language) or SPICE (Simulation Program for Integrated Circuit Emphasis). A Netlist can also describe the connectivity of an electronic design such as the components included in the design, the attributes of each component and the interconnectivity amongst the components. The EDA tool set facilitates floor planning of components including adding of constraints for component placement in the space available on the chip such as XY coordinates on the chip, and routes metal connections for those components. The EDA tool set provides the information for lithographic masks to be generated from this representation of the IP core to transfer the circuit design onto a chip during manufacture, or other similar useful derivations of the circuits described above. Accordingly, back-end programming may further include the physical verification of the layout to verify that it is physically manufacturable and the resulting SOC will not have any function-preventing physical defects.

In block 1220, a fabrication facility may fabricate one or more chips with the signal generation circuit utilizing the lithographic masks generated from the EDA tool set's circuit design and layout. Fabrication facilities may use a standard CMOS logic process having minimum line widths such as 1.0 um, 0.50 um, 0.35 um, 0.25 um, 0.18 um, 0.13 um, 0.10 um, 90 nm, 65 nm or less, to fabricate the chips. The size of the CMOS logic process employed typically defines the smallest minimum lithographic dimension that can be fabricated on the chip using the lithographic masks, which in turn, determines minimum component size. According to one embodiment, light including X-rays and extreme ultraviolet radiation may pass through these lithographic masks onto the chip to transfer the circuit design and layout for the test circuit onto the chip itself.

The EDA toolset may have configuration dialog plug-ins for the graphical user interface. The EDA toolset may have an RTL generator plug-in for the SocComp. The EDA toolset may have a SystemC generator plug-in for the SocComp. The EDA toolset may perform unit-level verification on components that can be included in RTL simulation. The EDA toolset may have a test validation testbench generator. The EDA toolset may have a dis-assembler for virtual and hardware debug port trace files. The EDA toolset may be compliant with open core protocol standards. The EDA toolset may have Transactor models, Bundle protocol checkers, OCPDis2 to display socket activity, OCPPerf2 to analyze performance of a bundle, as well as other similar programs.

As discussed, an EDA tool set may be implemented in software as a set of data and instructions, such as an Instance in a software library callable to other programs or an EDA tool set consisting of an executable program with the software cell library in one program, stored on a machine-readable medium. A machine-readable storage medium may include any mechanism that provides (e.g., stores and/or transmits) information in a form readable by a machine (e.g., a computer). For example, a machine-readable medium may include, but is not limited to: read only memory (ROM); random access memory (RAM); magnetic disk storage media; optical storage media; flash memory devices; DVD's; EPROMs; EEPROMs; FLASH, magnetic or optical cards; or any other type of media suitable for storing electronic instructions. The instructions and operations also may be practiced in distributed computing environments where the machine-readable media is stored on and/or executed by more than one computer system. In addition, the information transferred between computer systems may either be pulled or pushed across the communication media connecting the computer systems.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In an embodiment, the logic consists of electronic circuits that follow the rules of Boolean Logic, software that contain patterns of instructions, or any combination of both. Various components described above may be implemented in hardware logic, software, or any combination of both.

While some specific embodiments of the invention have been shown the invention is not to be limited to these embodiments. For example, most functions performed by electronic hardware components may be duplicated by software emulation. Thus, a software program written to accomplish those same functions may emulate the functionality of the hardware components in input-output circuitry. The invention is to be understood as not limited by the specific embodiments described herein, but only by scope of the appended claims.

We claim:

1. An integrated circuit comprising:
   an interconnect for the integrated circuit to communicate requests between multiple initiator intellectual property (IP) cores and multiple target IP cores coupled to the interconnect;
   an address map with assigned addresses for the target IP cores in the integrated circuit to route the requests between the target IP cores and initiator IP cores in the integrated circuit; and a memory scheduler coupled to a first target memory core of the target IP cores that includes a bank of memories, where the memory scheduler contains two or more configurable address tiling functions to transform an incoming address of data requested in a first request to the first target memory core to determine what physical addresses in the bank of memories will service the first request, wherein the two or more configurable address tiling functions are programmable by a user to create two or more distinctly different memory regions in the first target memory core with each memory region having its own distinct tiling function based on configuration parameters 1) selected by the user and 2) stored in tiling registers in the memory scheduler, and the multiple tiling functions are configured to operate concurrently in the integrated circuit.

2. The integrated circuit of claim 1, wherein the user can program two to seven tiling functions into the tiling registers at runtime and all of the tiling functions can function concurrently at the same time, where each tiling function is implemented in its own a discrete region of the first target memory core, which applies that tiling function to at least requests for data in that discrete region memory, and the user can choose the tiling function for a given region that is most suitable for an application that is anticipated to be run, at runtime.

3. The integrated circuit of claim 1, wherein the first target memory core is a Dynamic Random Access Memory (DRAM) and the memory scheduler supports three to seven tiling functions, and configuration parameters for the tiling functions are programmed into two or more configurable registers in the memory scheduler by the user.

4. The integrated circuit of claim 1, wherein the first target memory core is a dynamic random access memory (DRAM) with the bank of memories and the memory scheduler has logic for the configurable address tiling functions, which allow the user of the integrated circuit to select parameters that considerably improve page hits for consecutive memory accesses in the DRAM, compared to an un-tiled address in the first request, by transforming the un-tiled address in the first request to a second address with better access and utilization address parameters for the DRAM memory bank in that instance of a design, where the memory scheduler is coupled downstream of the interconnect, and address tiling is performed on the first request after the first request has been chopped by chopping logic to have a starting address of an initial word in the first request and ending address of a last word in the first request to fit within a DRAM block size so no further chopping needs to occur for the DRAM to service this first request.

5. The integrated circuit of claim 1, wherein the memory scheduler has logic that implements the configurable address tiling functions and references the selected parameters in the tiling registers and the logic is configured to recognize an incoming request having address bits or a request pattern that the logic in the memory scheduler recognizes as not needing the configurable address tiling functions applied.

6. The integrated circuit of claim 1, wherein address space assigned to a first memory region in the first target memory core has a configured tiling function with selected parameters to optimize two dimensional (2-D) memory page retrieval for a 2-D block request, where address space assigned to a second memory region in the first target memory core has a configured tiling function with selected parameters to optimize linear instruction memory page retrieval for incrementing block request, and both of the first and second memory regions are addressable through the memory scheduler.

7. The integrated circuit of claim 1, wherein the first target memory core is a dynamic random access memory (DRAM) and a range for the DRAM's page size and a number of banks in the DRAM are part of the configuration parameters for the address tiling functions to thereby allow the user to use DRAMs with potentially different characteristics including numbers of banks, different page sizes, support different burst lengths, than originally envisioned and simply program in new configuration parameters for characteristics of the DRAM actually being used in that instance of the integrated circuit.

8. The integrated circuit of claim 1, wherein each tiling function consists of an address swapping stage and a bank-address transformation stage that are calculated in parallel with each other but an address swapping operation occurs before a bank-address transformation, where a first register in the tiling registers is used to specify address swapping parameters and a second register is used to specify bank-address transformation parameters.

9. A machine-readable medium having data and instructions of an Electronic Design Automation (EDA) toolset used in a System-on-a-Chip design process stored thereon, which, when executed by a machine, cause the machine to generate a representation of the integrated circuit of claim 1.

10. An integrated circuit comprising:
an interconnect for the integrated circuit to communicate requests between multiple initiator intellectual property (IP) cores and multiple target IP cores coupled to the interconnect;
an address map with assigned addresses for the target IP cores in the integrated circuit to route the requests between the target IP cores and initiator IP cores in the integrated circuit; and
a memory scheduler coupled to a first target memory core of the target IP cores that includes a bank of memories, where the memory scheduler contains two or more configurable address tiling functions to transform an incoming address of data requested in a first burst request to the first target memory core to determine what physical addresses in the bank of memories will service the first burst request, wherein address space in the first target memory core is divided to create two or more regions of memory and each region has its own distinctly different address tiling function based on tiling register settings for that region, where address tiling logic and registers in the memory scheduler are configured to perform a first configurable address tiling function of a first operation of address bit swapping in an incoming address of the first burst request, which is used to improve page hit rates of block bursts and then a second operation of applying a Boolean logic function that manipulates bank address bits in the incoming address of the first burst request, which is used to minimize back to back page misses to a same bank in the first target memory core.

11. The integrated circuit of claim 10, wherein the first target memory core is a dynamic random access memory (DRAM), and the first configurable address tiling function in the memory scheduler is performed by first applying an address swapping transformation based on configuration parameters in a first address tiling register, followed by a Boolean ADD transformation for bank address selection based on configuration parameters in a first bank tiling register.

12. The integrated circuit of claim 11, wherein the configuration parameters for the first bank tiling register control the Boolean ADD transformation to allow a user to select parameters from at least a group consisting of starting bit location of a tiled address, low and high order bank address bits, and bank width.

13. The integrated circuit of claim 10, wherein the first address bit swapping operation is used to re-order address bits of an un-tiled address to improve page hits for consecutive memory accesses in the first target memory core, compared to an un-tiled address in the first burst request, by transforming the un-tiled address in the first burst request to a second address with better access and utilization address parameters for the memory banks in the first target memory core for a type of application anticipated to be using that region of the memory, and the Boolean logic function performed on bank address bits is an ADD function used to select a different bank in the event of a page miss, such that page pre-charge costs are reduced, and both parameters for the address bit swapping operation and the Boolean logic function are configurable by a designer of the integrated circuit.

14. The integrated circuit of claim 10, wherein the Boolean logic function of address tiling performed on bank address bits of the incoming address is an ADD function so that memory pages on different banks can be accessed, where the ADD function that has a property of generating a checkerboard like access pattern, where first target memory core is a dynamic random access memory (DRAM), the memory scheduler is coupled downstream of the interconnect, and the address tiling is performed on the first burst request after the first burst request has been chopped by chopping logic to have a starting address of an initial word in the first burst request and an ending address of the last word in the burst request to fit within a DRAM block size so no further chopping needs to occur for the DRAM to service this first burst request.

15. The integrated circuit of claim 10, wherein a first configurable address tiling is performed on address bits below the Least Significant Bit of a position of chip bits in address bits of the first burst request in order to define a first configurable address tiling function on a per chip basis.

16. The integrated circuit of claim 10, wherein the address bit swapping is performed before bank address transformation, but the bank address transformation is calculated in parallel with the address bit swapping, and a final tiled address generated by the address tiling logic is obtained by replacing bank select bits in swapped address by those obtained from the bank-address transformation.

17. A machine-readable medium having data and instructions of an Electronic Design Automation (EDA) toolset used in a System-on-a-Chip design process stored thereon, which, when executed by a machine, cause the machine to generate a representation of the integrated circuit of claim 10.

18. The integrated circuit of claim 10, wherein the bank address manipulation is performed using both low and high order address bits in an incoming address of the first burst request to determine the address swapping operation.

19. An integrated circuit comprising:
an interconnect for the integrated circuit to communicate requests between multiple initiator intellectual property (IP) cores and multiple target IP cores coupled to the interconnect;
an address map with assigned addresses for the target IP cores in the integrated circuit to route the requests between the target IP cores and initiator IP cores in the integrated circuit; and
a memory scheduler coupled in between the interconnect and a first target memory core of the target IP cores that includes a Dynamic Random Access Memory (DRAM) bank of memories, where the memory scheduler contains two or more configurable address tiling functions to transform an incoming address of data requested in a first burst request to the first target memory core to determine what physical addresses in the bank of memories will service the first request, wherein an address tiling function is performed on the first burst request after the first burst request has been chopped by chopping logic to have a starting address of an initial word in the first burst request and ending address of the last word in the first burst request to fit within a DRAM block size so no further chopping needs to occur for the DRAM to service the first burst request.

20. The integrated circuit of claim 19, wherein the memory scheduler has tiling registers to receive configurable parameters for the address tiling function and an address tiling logic, which both are configured to perform a first configurable address tiling function of a first operation of address bit swapping used to improve page hit rates of block bursts and then a second operation of applying a Boolean logic function that manipulates bank address bits in the incoming address of the first burst request to minimize back to back page misses to a same bank, wherein all of the address bits involved in transformations from the first configurable address tiling function, the address bit swapping operation and the bank-address manipulation are above an address value equal to a variable DRAM block size to ensure that additional chopping will not be necessary.

21. The integrated circuit of claim 20, wherein a user can program two to seven tiling functions into the tiling registers at runtime and all of the tiling functions may be functioning at the same time, where each tiling function is implemented in its own a discrete region of the DRAM, which applies that address tiling function to requests for data in that discrete region memory, and the user can choose an address tiling function for a given region that is most suitable for an application that is anticipated to be run, at runtime.

22. A machine-readable medium having data and instructions of an Electronic Design Automation (EDA) toolset used in a System-on-a-Chip design process stored thereon, which, when executed by a machine, cause the machine to generate a representation of the integrated circuit of claim 19.

* * * * *